(12) United States Patent
Oizumi et al.

(10) Patent No.: US 10,143,917 B2
(45) Date of Patent: Dec. 4, 2018

(54) OPERATION SYSTEM, GAME SYSTEM, AND GAME CONTROLLER CAPABLE OF IDENTIFYING CONNECTED DEVICE WITH SIMPLIFIED SCHEME

(71) Applicant: NINTENDO CO., LTD., Kyoto-shi, Kyoto (JP)

(72) Inventors: Toshiki Oizumi, Kyoto (JP); Shumpei Yasuda, Kyoto (JP); Ryo Fukasawa, Kyoto (JP); Tomofumi Ikeda, Kyoto (JP); Yuki Tamaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/491,234

(22) Filed: Apr. 19, 2017

(65) Prior Publication Data

US 2018/0193731 A1 Jul. 12, 2018

(30) Foreign Application Priority Data

Jan. 12, 2017 (JP) ................................. 2017-003396

(51) Int. Cl.
*G06F 1/26* (2006.01)
*A63F 13/24* (2014.01)
(Continued)

(52) U.S. Cl.
CPC .............. *A63F 13/24* (2014.09); *A63F 13/22* (2014.09); *A63F 13/23* (2014.09); *A63F 13/25* (2014.09); *A63F 13/90* (2014.09); *A63F 13/92* (2014.09)

(58) Field of Classification Search
CPC ........ A63F 13/21; A63F 13/23; A63F 13/235; A63F 13/24; A63F 2300/1025;
(Continued)

(56) References Cited

U.S. PATENT DOCUMENTS 5,558,577 A 9/1996 Kato
6,499,071 B1 * 12/2002 Hadderman ........ G06F 13/4081
710/100
(Continued)

FOREIGN PATENT DOCUMENTS

| EP | 2 251 765 | 11/2010 |
| EP | 2 260 912 | 12/2010 |
| JP | 2005-275971 | 10/2005 |

*Primary Examiner* — Lawrence Galka
(74) *Attorney, Agent, or Firm* — Nixon & Vanderhye PC

(57) ABSTRACT

An example connected device includes a first battery for supplying electric power to a game controller, a first terminal electrically connected to the game controller, and a resistor connected to the first terminal. The game controller includes a controlled component, a second battery for supplying electric power to the controlled component, a second terminal electrically connected to the connected device, a voltage detecting circuit detecting a voltage value in accordance with a current which flows through the resistor when the first terminal and the second terminal are connected to each other, and a control circuit. The control circuit discriminates a device connected to the game controller based on the detected voltage value, and switches from the second battery to the first battery when the discriminated device is the connected device while electric power is supplied from the second battery to the controlled component.

15 Claims, 14 Drawing Sheets

(51) Int. Cl.
*A63F 13/25* (2014.01)
*A63F 13/22* (2014.01)
*A63F 13/92* (2014.01)
*A63F 13/90* (2014.01)
*A63F 13/23* (2014.01)

(58) Field of Classification Search
CPC ....... A63F 2300/1043; A63F 2300/204; G06F 1/26; G06F 1/263; G06F 1/3203; G06F 3/0202; G06F 9/4415; G06F 11/3051; G06F 11/328; G06F 13/4068; Y02D 10/14; Y02D 10/151
See application file for complete search history.

(56) References Cited

U.S. PATENT DOCUMENTS

| | | | |
|---|---|---|---|
| 8,949,477 B2* | 2/2015 | Drasnin | G06F 9/4415 710/8 |
| 2013/0232350 A1* | 9/2013 | Belesiu | G06F 1/263 713/300 |
| 2013/0281213 A1* | 10/2013 | Yasuda | A63F 13/42 463/39 |
| 2015/0192975 A1* | 7/2015 | Kawai | G06F 1/3203 713/323 |
| 2016/0361633 A1* | 12/2016 | Fujita | A63F 13/23 |
| 2018/0120915 A1* | 5/2018 | Li | G06F 1/324 |

\* cited by examiner

FIG.14

| IDENTIFICATION INFORMATION | VOLTAGE VALUE | AMOUNT OF CHARGING CURRENT | NOTIFICATION ABOUT CHARGING | EXEMPLARY DEVICE |
|---|---|---|---|---|
| ID0 | P0~P1 | Q1 | NO | MAIN BODY, EXPANSION GRIP |
| ID1 | P1~P2 | Q1 | NO | TRIAL PLAY STAND EXPANSION BATTERY |
| ID2 | P2~P3 | Q2 | YES | FIXED EXPANSION BATTERY |
| ID3 | P3~P4 | Q1 | YES | EXPANSION BATTERY |
| ID4 | NO | NO | NO | — |

OPERATION SYSTEM, GAME SYSTEM, AND GAME CONTROLLER CAPABLE OF IDENTIFYING CONNECTED DEVICE WITH SIMPLIFIED SCHEME

This nonprovisional application is based on Japanese Patent Application No. 2017-003396 filed with the Japan Patent Office on Jan. 12, 2017, the entire contents of which are hereby incorporated by reference.

FIELD

The present disclosure relates to processing in an operation system, a game system, and a game controller.

BACKGROUND AND SUMMARY

As one of schemes for an apparatus to identify a connected device connected to the apparatus, a scheme to use identification information of the connected device has conventionally been proposed.

By way of example, a scheme for obtaining an identification code of a home electrical appliance through UART communication by an adapter with the home electrical appliance is available.

When an apparatus identifies a connected device through communication or the like, however, processing is complicated and also time-consuming.

The present disclosure aims to solve the problem above and an object thereof is to provide an operation system, a game system, and a game controller capable of identifying a connected device with a simplified scheme.

An operation system according to one aspect includes a game controller and a connected device connected to the game controller. The connected device includes a first battery for supplying electric power to the game controller, a first terminal electrically connected to the game controller, and a resistor connected to the first terminal. The game controller includes a controlled component, a second battery for supplying electric power to the controlled component, a second terminal electrically connected to the connected device, a voltage detecting circuit detecting a voltage value in accordance with a current which flows through the resistor when the first terminal and the second terminal are connected to each other, and a control circuit. The control circuit discriminates a device connected to the game controller based on the voltage value detected by the voltage detecting circuit, and switches from the second battery to the first battery for supply of electric power to the controlled component when the discriminated device is the connected device while electric power is supplied from the second battery to the controlled component.

Since a device connected to the game controller can be discriminated based on a voltage value detected by the voltage detecting circuit, a connected device can be identified with a simplified scheme.

In the exemplary embodiment, the connected device may include a light emitter emitting light in accordance with a result of discrimination by the control circuit.

By providing the light emitter, connection of the connected device can readily be checked.

In the exemplary embodiment, the game controller may include a light emission control circuit controlling the light emitter to emit light when the device discriminated by the control circuit is the connected device.

Since light emission by the light emitter can be controlled by the light emission control circuit, a notification about connection of the connected device can readily be given.

In the exemplary embodiment, the second battery is configured to be charged through supply of electric power from the first battery as switching from the second battery to the first battery is made by the control circuit.

In the exemplary embodiment, the light emission control circuit may determine whether or not a state of charge of the second battery is equal to or higher than a prescribed level, and may have the light emitter emit light when the light emission control circuit determines that the state of charge of the second battery is not equal to or higher than the prescribed level.

Since the light emitter is controlled in accordance with a state of charge, the state of charge as a result of connection of the connected device can readily be checked.

In the exemplary embodiment, the operation system includes another connected device different from the connected device. Another connected device may further include a microcomputer, a third terminal electrically connected to the game controller, and a device communication circuit transmitting identification information of another connected device itself to the game controller from the microcomputer through the third terminal. The control circuit of the game controller may discriminate a device connected to the game controller based on any of the transmitted identification information and the voltage value detected by the voltage detecting circuit.

Since the game controller can obtain identification information from the microcomputer, discrimination as the connected device containing the microcomputer can easily be made.

A game system according to one aspect includes a game controller, a connected device connected to the game controller, and a main body apparatus. The connected device includes a first battery for supplying electric power to the game controller, a first terminal electrically connected to the game controller, and a resistor connected to the first terminal. The game controller includes a controlled component, a second battery for supplying electric power to the controlled component, a second terminal electrically connected to the connected device, a voltage detecting circuit detecting a voltage value in accordance with a current which flows through the resistor when the first terminal and the second terminal are connected to each other, and a control circuit. The control circuit discriminates a device connected to the game controller based on the voltage value detected by the voltage detecting circuit, switches from the second battery to the first battery for supply of electric power to the controlled component when the discriminated device is the connected device while electric power is supplied from the second battery to the controlled component, and transmits a result of discrimination to the main body apparatus.

A device connected to the game controller can be discriminated with a simplified scheme based on a voltage value detected by the voltage detecting circuit of the game controller. Since the result of discrimination is transmitted to the main body apparatus, the main body apparatus can recognize the connected device with a simplified scheme.

In the exemplary embodiment, the main body apparatus may include an information processing circuit performing information processing based on the result of discrimination by the control circuit.

By performing information processing based on the result of discrimination in the main body apparatus, appropriate information processing in accordance with the connected device can be performed.

In the exemplary embodiment, the information processing circuit displays, on a display, information on the device connected to the game controller and discriminated based on the result of discrimination by the control circuit.

By showing information on the device connected to the game controller, usability can be improved.

In the exemplary embodiment, the control circuit transmits the result of discrimination to the main body apparatus through wireless communication.

By transmitting the result of discrimination to the main body apparatus through wireless communication, information can be transmitted and received with a simplified scheme.

A game controller according to another aspect is configured to be connected to a connected device including a first battery configured to supply electric power and a first terminal for supplying electric power from the first battery. The game controller includes a controlled component, a second battery for supplying electric power to the controlled component, a second terminal for electrical connection to the connected device, a voltage detecting circuit detecting a voltage value in accordance with a current which flows through a resistor provided in the connected device when the first terminal and the second terminal are connected to each other, and a control circuit. The control circuit discriminates a device connected to the game controller based on the voltage value detected by the voltage detecting circuit, and switches from the second battery to the first battery for supply of electric power to the controlled component when the discriminated device is the connected device while electric power is supplied from the second battery to the controlled component.

Since a device connected to the game controller is configured to be discriminated based on a voltage value detected by the voltage detecting circuit, a connected device can be identified with a simplified scheme.

In the exemplary embodiment, the game controller may further include a light emission control circuit controlling a light emitter provided in the connected device to emit light when the device discriminated by the control circuit is the connected device.

By providing the light emitter, connection of the connected device can readily be checked.

In the exemplary embodiment, the second battery is configured to be charged through supply of electric power from the first battery as switching from the second battery to the first battery is made by the control circuit.

In the exemplary embodiment, the light emission control circuit may determine whether or not a state of charge of the second battery is equal to or higher than a prescribed level, and control the light emitter to emit light when the device discriminated by the control circuit is the connected device and the light emission control circuit determines that the state of charge of the second battery is not equal to or higher than the prescribed level.

Since the light emission control circuit controls the light emitter based on a state of charge, the state of charge can easily be determined.

In the exemplary embodiment, the control circuit transmits a result of discrimination to a main body apparatus.

Since the result of discrimination is transmitted to the main body apparatus, the main body apparatus can recognize the connected device with a simplified scheme.

In the exemplary embodiment, the control circuit may receive an instruction from the main body apparatus based on the result of discrimination. The control circuit performs prescribed processing in accordance with the instruction received from the main body apparatus.

Since prescribed processing can be performed in response to an instruction from the main body apparatus in accordance with the result of discrimination by the control circuit, usability can be improved.

In the exemplary embodiment, the game controller may further include a memory storing a table in which identification information for identifying a connected device and a voltage value are brought in correspondence with each other. The control circuit may discriminate a device connected to the game controller with reference to the table stored in the memory, based on the voltage value detected by the voltage detecting circuit.

A plurality of types of connected devices can be identified with a simplified scheme by using a table.

In the exemplary embodiment, the game controller is configured to be connected to another connected device different from the connected device. Another connected device includes a microcomputer, a third terminal electrically connected to the game controller, and a device communication circuit transmitting identification information of another connected device itself to the game controller from the microcomputer through the third terminal. The control circuit discriminates a device connected to the game controller based on any of the transmitted identification information and the voltage value detected by the voltage detecting circuit.

Since the game controller can obtain identification information from the microcomputer, discrimination as the connected device containing the microcomputer can easily be made.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 14 is an example non-limiting diagram illustrating a discrimination table used by a discrimination unit 120 based on the embodiment.

DETAILED DESCRIPTION OF NON-LIMITING EXAMPLE EMBODIMENTS

Figure 1:
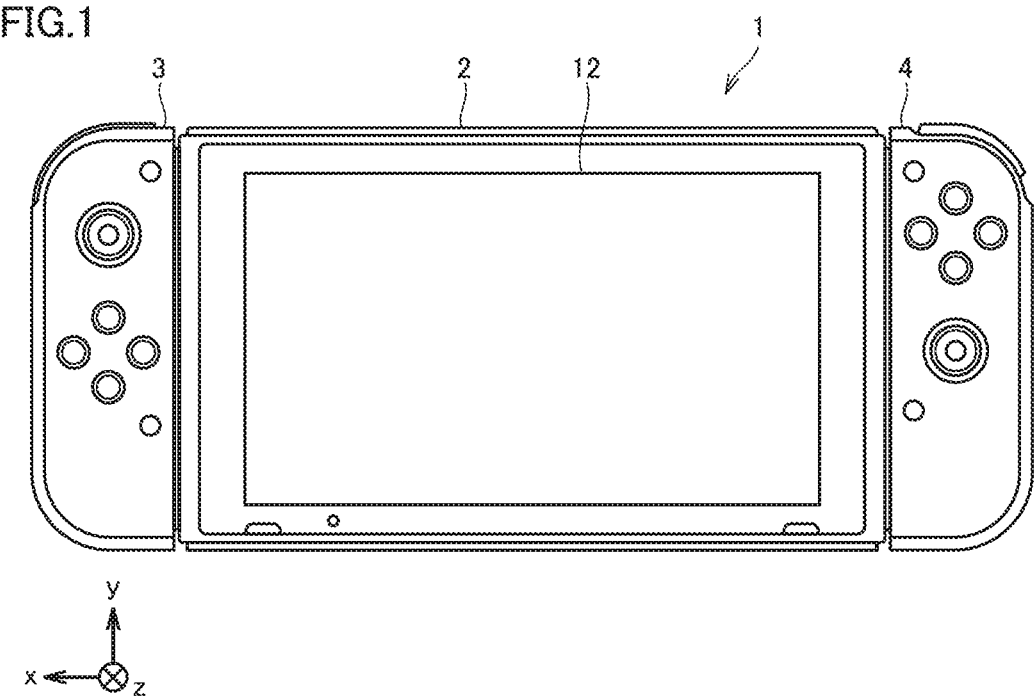
FIG. 1 is an example non-limiting schematic diagram showing appearance of a game device 1 based on the present embodiment.

This embodiment will be described in detail with reference to the drawings. The same or corresponding elements in the drawings have the same reference characters allotted and description thereof will not be repeated.

[A. Information Processing System]

An apparatus configuration relating to an information processing system based on the present embodiment will be described. The information processing system based on the present embodiment is configured at least with an information processing apparatus described below.

For example, an information processing apparatus may be a portable (also referred to as mobile) device such as a portable game device, a portable telephone, or a smartphone, a stationary apparatus such as a personal computer or a home game console, or a large apparatus such as an arcade game machine. In the present example, a game device representing one example of an information processing apparatus will be described by way of example. Though a game controller provided for a game device will be described in the present example by way of example of an operation apparatus, limitation in particular to a game controller is not intended and any operation apparatus may be applicable so long as it functions as an input device capable of transmitting operation data to an information processing apparatus.

(a1: Overall Configuration of Game Device)

FIG. 1 is an example non-limiting schematic diagram showing appearance of a game device 1 based on the present embodiment.

As shown in FIG. 1, game device 1 includes a main body apparatus 2, a left controller 3, and a right controller 4. Main body apparatus 2 includes a display 12 representing one example of a display portion and performs various types of processing including game processing in game device 1.

Figure 2:
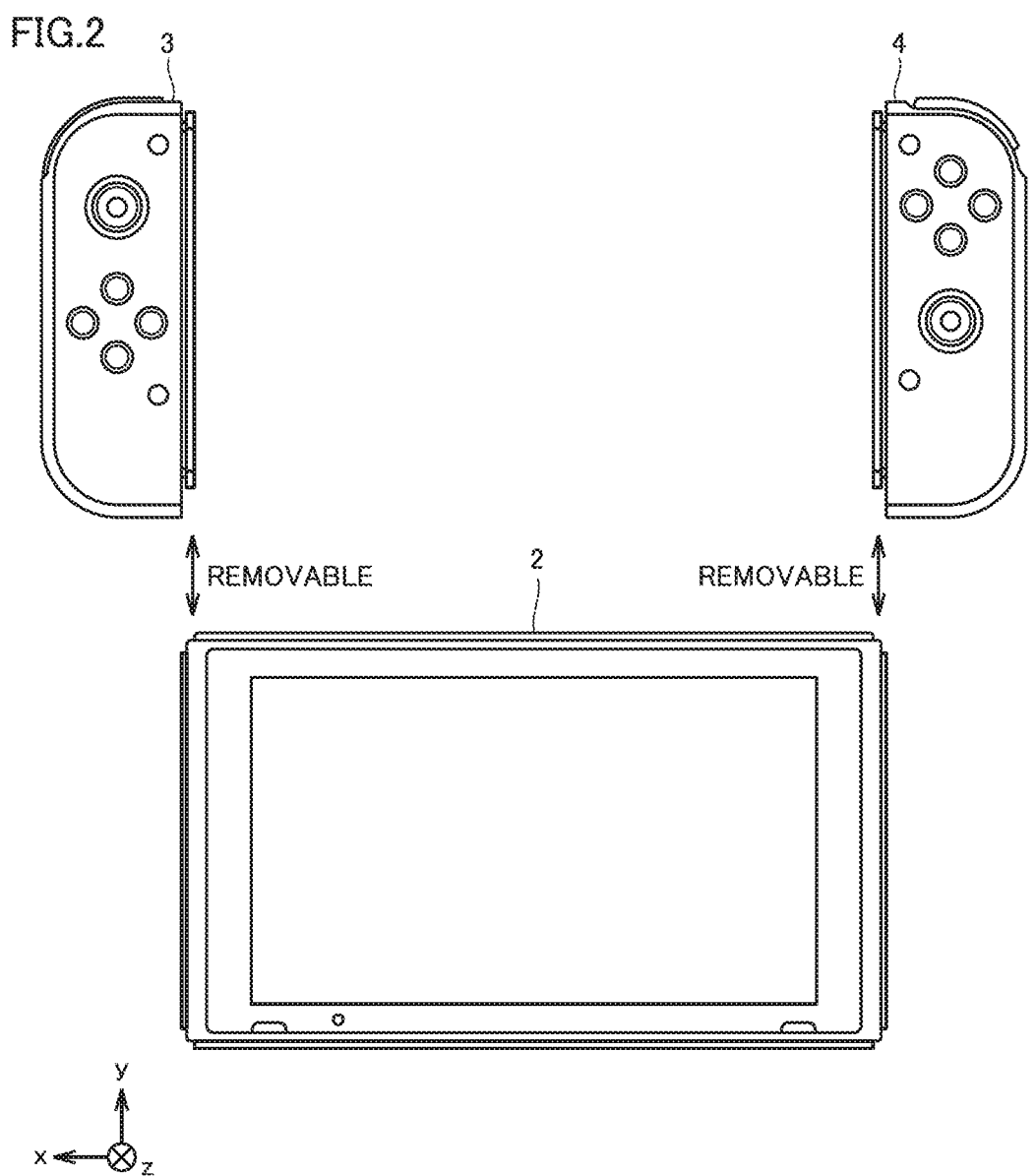
FIG. 2 is an example non-limiting schematic diagram showing appearance of another manner of game device 1 based on the present embodiment.

FIG. 2 is an example non-limiting schematic diagram showing appearance of another manner of game device 1 based on the present embodiment.

As shown in FIG. 2, left controller 3 and right controller 4 may be constructed as being detachable from main body apparatus 2. Left controller 3 and right controller 4 may integrally be constructed or left controller 3 and right controller 4 may be constructed as separate apparatuses. Thus, left controller 3 and right controller 4 corresponding to an operation portion may be constructed separately from main body apparatus 2.

Left controller 3 can be attached to a left side (a side of a positive direction of an x axis shown in FIG. 1) of main body apparatus 2. Right controller 4 can be attached to a right side (a side of a negative direction of the x axis shown in FIG. 1) of main body apparatus 2. In the description below, left controller 3 and right controller 4 may collectively be referred to as a "controller". A more specific configuration example of main body apparatus 2, left controller 3, and right controller 4 will be described below.

(a2: Structure of Main Body Apparatus)

Figure 3:
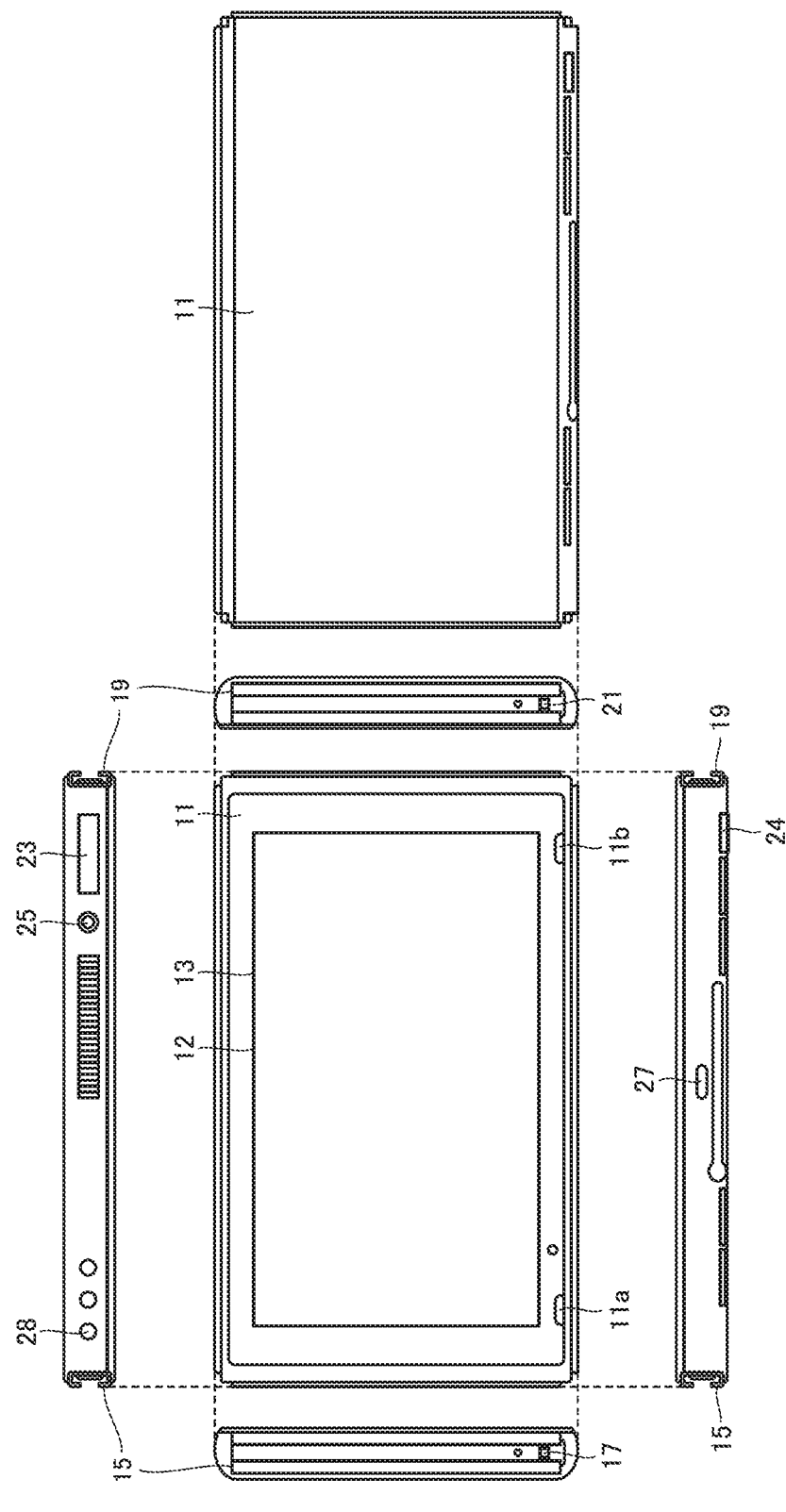
FIG. 3 is an example non-limiting diagram of a main body apparatus 2 based on the present embodiment when viewed from six sides.

FIG. 3 is an example non-limiting diagram of main body apparatus 2 based on the present embodiment when viewed from six sides.

Referring to FIG. 3, main body apparatus 2 has a housing 11 substantially in a form of a plate.

A main surface of housing 11 (that is, a front surface or a surface where display 12 is provided) is substantially in a rectangular shape. In the description below, housing 11 is in a horizontally long shape and a longitudinal direction of the main surface (that is, the direction of the x axis shown in FIG. 1) is referred to as a lateral direction (or a left-right direction) and a direction of a short side of the main surface (that is, a direction of a y axis shown in FIG. 1) is referred to as a vertical direction (or an up-down direction). A direction perpendicular to the main surface of housing 11 (that is, a direction of a z axis shown in FIG. 1) is referred to as a direction of depth (or a front-rear direction).

Main body apparatus 2 can be used with its main surface being laterally oriented or with its surface being vertically oriented when a user holds the main body apparatus. Therefore, denotation as the lateral direction and the vertical direction is given for the sake of convenience of description.

A shape and a size of housing 11 can arbitrarily be designed. For example, in another embodiment, a protrusion portion or a grip portion for facilitating holding by a user may be added to housing 11.

(1) Member Provided on Main Surface of Housing 11

As shown in FIGS. 1 to 3, display 12 is provided on the main surface of housing 11 of main body apparatus 2. Display 12 shows an image obtained or generated by main body apparatus 2 (which may be a still image or moving images). When game processing is performed, display 12 shows a virtual space and an object in the virtual space. Though display 12 is typically implemented by a liquid crystal display (LCD), a display apparatus of any type can be adopted.

A touch panel 13 is provided on a screen of display 12. Typically, a device of a type accepting a multi-touch input (for example, a capacitance type) is adopted as touch panel 13. For example, a device of any type such as a device of a type accepting a single-touch input (for example, a resistive film type) can be adopted as touch panel 13.

Speaker holes 11a and 11b are provided in the main surface of housing 11 of main body apparatus 2 and sound generated from a speaker (a speaker 88 shown in FIG. 7) arranged in housing 11 is output through speaker holes 11a and 11b.

Two speakers are provided in main body apparatus 2 and speaker holes 11a and 11b are provided in correspondence with respective positions of a left speaker and a right speaker. Speaker hole 11a is provided on a left side of display 12 in correspondence with the left speaker and speaker hole 11b is provided on a right side of display 12 in correspondence with the right speaker.

A position, a shape, and the number of speaker holes 11a and 11b can arbitrarily be designed. For example, in another embodiment, speaker holes 11a and 11b may be provided in a side surface or a rear surface of housing 11.

(2) Member Provided on Left Side Surface of Housing 11

A left rail member 15 for removably attaching left controller 3 to main body apparatus 2 is provided in a left side surface of housing 11. Left rail member 15 extends along the up-down direction in the left side surface of housing 11. Left rail member 15 is in a shape allowing engagement thereof with a slider (a slider 40 shown in FIG. 4) for left controller 3. A slide mechanism is formed by left rail member 15 and slider 40. With such a slide mechanism, left controller 3 can slidably and removably be attached to main body apparatus 2.

A left terminal 17 is provided in the left side surface of housing 11. Left terminal 17 is a terminal for wired communication between main body apparatus 2 and left controller 3. Left terminal 17 is provided at a position where it comes in contact with a terminal (a terminal 42 shown in FIG. 4) of left controller 3 when left controller 3 is attached to main body apparatus 2. Left terminal 17 should be arranged at a position where the left terminal of main body apparatus 2 and the terminal of left controller 3 are in contact with each other while left controller 3 is attached to main body apparatus 2. By way of example, as shown in FIG. 3, left terminal 17 is provided around a lower end portion of left rail member 15.

(3) Member Provided in Right Side Surface of Housing 11

As shown in FIG. 3, a feature similar to the feature provided in the left side surface is provided in a right side surface of housing 11. A right rail member 19 for removably attaching right controller 4 to main body apparatus 2 is provided in the right side surface of housing 11. Right rail member 19 extends along the up-down direction in the right side surface of housing 11. Right rail member 19 is in a shape allowing engagement thereof with a slider (a slider 62 shown in FIG. 5) for right controller 4. A slide mechanism is formed by right rail member 19 and slider 62. With such a slide mechanism, right controller 4 can slidably and removably be attached to main body apparatus 2.

Right rail member 19 is in a shape similar to left rail member 15. Right rail member 19 is in a grooved shape similar in cross-sectional shape to left rail member 15. Right rail member 19 does not have to be exactly the same in shape as left rail member 15. For example, another embodiment may be constructed such that slider 62 for right controller 4 cannot be engaged with left rail member 15 and/or slider 40 for left controller 3 cannot be engaged with right rail member 19 by making a size and/or a shape of the groove different between left rail member 15 and right rail member 19.

A right terminal 21 is provided in the right side surface of housing 11. Right terminal 21 is a terminal for wired communication between main body apparatus 2 and right controller 4. Right terminal 21 is provided at a position where it comes in contact with a terminal (a terminal 64 shown in FIG. 5) of right controller 4 when right controller 4 is attached to main body apparatus 2. Right terminal 21 should be arranged at any position where the right terminal of main body apparatus 2 and the terminal of right controller 4 are in contact with each other while right controller 4 is attached to main body apparatus 2. By way of example, as shown in FIG. 3, right terminal 21 is provided around a lower end portion of right rail member 19.

(4) Member Provided on Upper Side Surface of Housing 11

As shown in FIG. 3, a first slot 23 for attaching a storage medium of a first type is provided in an upper side surface of housing 11. A lid portion which can be opened and closed is provided in an opening in first slot 23 as a typical feature, and a storage medium of the first type can be inserted in first slot 23 while the lid portion is open. The storage medium of the first type is, for example, a storage medium exclusively designed for game device 1 and a game device of the same type (for example, a dedicated memory card). The storage medium of the first type is used, for example, for storing data used in main body apparatus 2 (for example, data saved for an application) and/or a program executed in main body apparatus 2 (for example, a program for an application).

A power button 28 for switching on and off main body apparatus 2 is provided on the upper side surface of housing 11.

When power button 28 is pressed and held (for example, power button 28 is continuously pressed for a prescribed time period or longer), processing for switching on and off main body apparatus 2 is performed.

An audio input and output terminal 25 (specifically an earphone jack) is provided in the upper side surface of housing 11. A microphone or an earphone can be attached to audio input and output terminal 25.

(5) Member Provided on Lower Side Surface of Housing 11

As shown in FIG. 3, a lower terminal 27 for wired communication between main body apparatus 2 and a cradle 5 which will be described later is provided in a lower side surface of housing 11. Lower terminal 27 is provided at a position where it comes in contact with a terminal of cradle 5 when main body apparatus 2 is attached to cradle 5. Typically, a universal serial bus (USB) connector (more specifically, a female connector) can be adopted as lower terminal 27.

A second slot 24 for attaching a storage medium of a second type different from the first type is provided in the lower side surface of housing 11. Second slot 24 may be provided in the surface where first slot 23 is provided. A lid portion which can be opened and closed is provided in an opening in second slot 24 as a typical feature, and a storage medium of the second type can be inserted in second slot 24 while the lid portion is open. The storage medium of the second type may be, for example, a general-purpose storage medium (for example, an SD card). The storage medium of the second type is used, for example, for storing data used in main body apparatus 2 (for example, data saved for an application) and/or a program executed in main body apparatus 2 (for example, a program for an application), similarly to the storage medium of the first type.

A position, a shape, and the number of components (specifically, a button, a slot, and a terminal) provided in housing 11 described above can arbitrarily be designed. For example, in another embodiment, some of power button 28, first slot 23, and second slot 24 may be provided in another side surface or the rear surface of housing 11. Some of the components do not have to be provided.

(a3: Structure of Left Controller)

Figure 4:
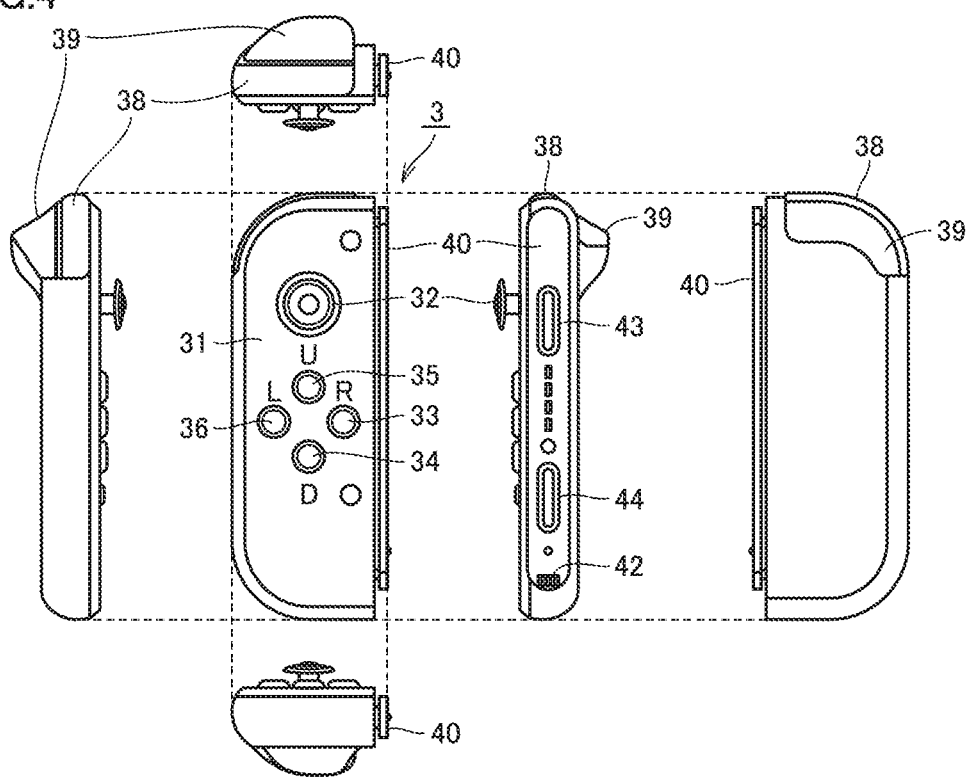
FIG. 4 is an example non-limiting diagram of a left controller 3 based on the present embodiment when viewed from six sides.

FIG. 4 is an example non-limiting diagram of left controller 3 based on the present embodiment when viewed from six sides.

Referring to FIG. 4, left controller 3 has a housing 31 substantially in a form of a plate. A main surface of housing 31 (that is, a front surface or a surface on a side of a negative direction of the z axis shown in FIG. 1) is substantially in a rectangular shape. Housing 31 is in a vertically long shape, that is, long in the up-down direction (that is, the direction of the y axis shown in FIG. 1).

Left controller 3 can be used with its main surface being vertically oriented or with its surface being horizontally oriented when a user holds the left controller while the left controller is detached from main body apparatus 2.

An analog stick 32 is provided in left controller 3. As shown in FIG. 4, analog stick 32 is provided on the main surface of housing 31. Analog stick 32 represents one example of a direction instruction portion with which a direction can be input. Analog stick 32 includes a stick member which can be tilted in all directions (that is, a 360° direction including up, down, left, right, and diagonal directions) in parallel to the main surface of housing 31. The analog stick is an analog input device with which a user can input a direction in accordance with a direction of tilt by titling the stick member. Analog stick 32 may further be constructed to be able to give an input of magnitude in accordance with an angle of tilt in addition to input of a direction in accordance with a direction of tilt when the stick member is tilted. Alternatively, a slide stick may implement the direction instruction portion. The slide stick is an input portion having a stick member slidable in all directions in parallel to the main surface of housing 31, and the user can give an input in accordance with a direction of slide by sliding the stick member. The slide stick may further be constructed also to give an input of magnitude in accordance with an amount of slide. Alternatively, the direction instruction portion may be implemented as an input portion indicating a direction through an operation to press a button. For example, the direction instruction portion may be implemented as an input portion indicating a direction with a cross-shaped key or four buttons corresponding to up, down, left, and right directions, respectively. In the present embodiment, an input can be given by pressing the stick member (in the direction perpendicular to housing 31). Analog stick 32 in the present embodiment is an input portion with which an input of a direction and magnitude in accordance with a direction of tilt and an amount of tilt of the stick member can be given and an input resulting from pressing of the stick member can be given.

Left controller 3 includes four operation buttons 33 to 36 (specifically, a right direction button 33, a down direction button 34, an up direction button 35, and a left direction button 36). As shown in FIG. 4, these four buttons 33 to 36 are provided under analog stick 32 on the main surface of housing 31. Though four operation buttons are provided on the main surface of left controller 3 in the present embodiment, any number of operation buttons may be provided. These operation buttons 33 to 36 are used for giving an instruction in accordance with various programs (for example, an OS program or an application program) executed in main body apparatus 2. Since operation buttons 33 to 36 may be used for giving an input of a direction in the present embodiment, operation buttons 33 to 36 are also referred to as right direction button 33, down direction button 34, up direction button 35, and left direction button 36 for the sake of convenience of description. Operation buttons 33 to 36 may be used for giving an instruction other than an input of a direction.

An operation portion (specifically, analog stick 32 and operation buttons 33 to 36) provided on the main surface of left controller 3 is operated, for example, with the left thumb of a user who holds game device 1 when left controller 3 is attached to main body apparatus 2. When left controller 3 is used as being detached from main body apparatus 2, the operation portion is operated, for example, with the left thumb of the user who holds left controller 3.

A first L button 38 and a ZL button 39 are provided in left controller 3. These operation buttons 38 and 39 are used for giving an instruction in accordance with various programs executed in main body apparatus 2, similarly to operation buttons 33 to 36 described above. As shown in FIG. 4, first L button 38 is provided in an upper left portion on the side surface of housing 31. ZL button 39 is provided in an upper left portion as extending from the side surface to the rear surface of housing 31 (strictly speaking, the upper left portion when housing 31 is viewed from the front). ZL button 39 is provided in the rear of first L button 38 (a side of a positive direction of the z axis shown in FIG. 1). Since the upper left portion of housing 31 is rounded in the present embodiment, first L button 38 and ZL button 39 are in a rounded shape in conformity with rounding of the upper left portion of housing 31.

When left controller 3 is attached to main body apparatus 2, first L button 38 and ZL button 39 are arranged in the upper left portion of game device 1 (see FIG. 1). Therefore, a user who holds game device 1 can operate first L button 38 and ZL button 39 with his/her left forefinger or long finger.

Left controller 3 has terminal 42 for wired communication between left controller 3 and main body apparatus 2. Terminal 42 is provided at a position where it comes in contact with left terminal 17 (FIG. 3) of main body apparatus 2 when left controller 3 is attached to main body apparatus 2. Terminal 42 should be arranged at any position where main body apparatus 2 and left controller 3 are in contact with each other while left controller 3 is attached to main body apparatus 2. By way of example, as shown in FIG. 4, terminal 42 is provided around a lower end portion of the surface where slider 40 is attached.

Left controller 3 includes a second L button 43 and a second R button 44. These buttons 43 and 44 are used for giving an instruction in accordance with various programs executed in main body apparatus 2 similarly to other operation buttons 33 to 36. As shown in FIG. 4, second L button 43 and second R button 44 are provided in the surface where slider 40 is attached. Second L button 43 is provided above the center in terms of the up-down direction (the direction of the y axis shown in FIG. 1) on the surface where slider 40 is attached. Second R button 44 is provided under the center in terms of the up-down direction on the surface where slider 40 is attached. Second L button 43 and second R button 44 are arranged at positions where they cannot be pressed while left controller 3 is attached to main body apparatus 2. Second L button 43 and second R button 44 are used while left controller 3 is detached from main body apparatus 2. Second L button 43 and second R button 44 are operated, for example, with a forefinger or a long finger of left and right hands of a user who holds left controller 3 detached from main body apparatus 2.

(a4: Structure of Right Controller)

Figure 5:
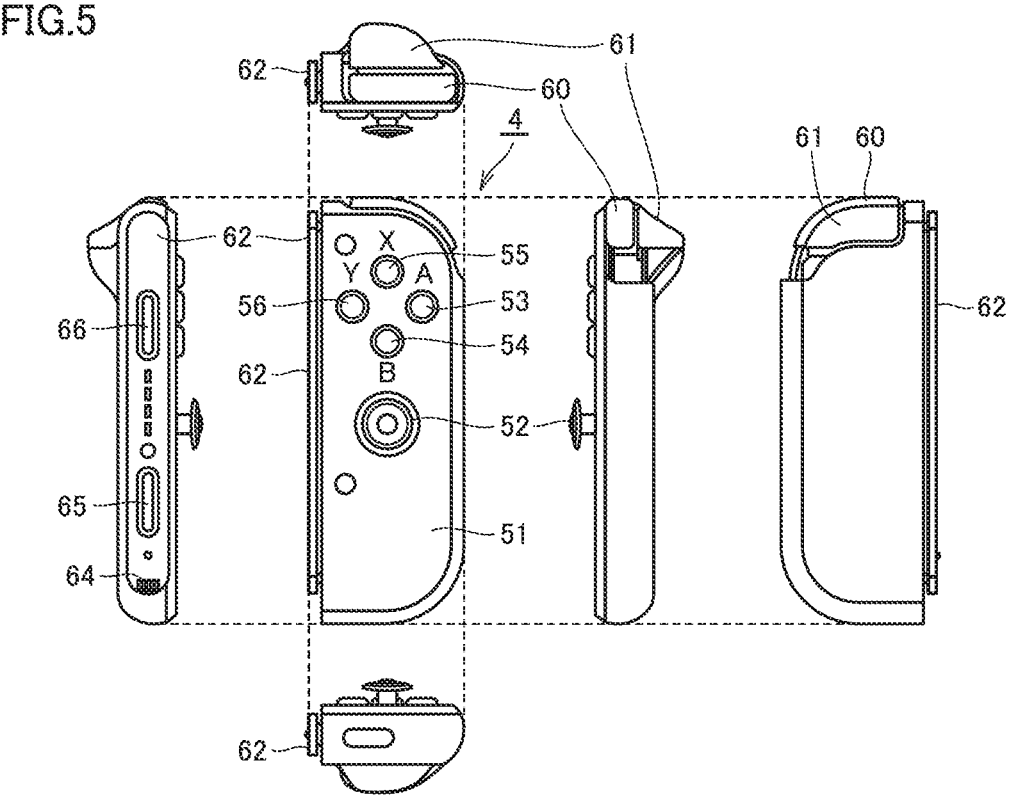
FIG. 5 is an example non-limiting diagram of a right controller 4 based on the present embodiment when viewed from six sides.

FIG. 5 is an example non-limiting diagram of right controller 4 based on the present embodiment when viewed from six sides.

Referring to FIG. 5, right controller 4 has a housing 51 substantially in a form of a plate. A main surface of housing 51 (that is, a front surface or a surface on the side of the negative direction of the z axis shown in FIG. 1) is substantially in a rectangular shape. Housing 51 is in a vertically long shape, that is, long in the up-down direction.

Right controller 4 can be used with its main surface being vertically oriented or with its surface being horizontally oriented when a user holds the right controller while the right controller is detached from main body apparatus 2.

An analog stick 52 is provided in right controller 4 as a direction instruction portion as in left controller 3. Analog stick 52 is constructed substantially similarly to analog stick 32 in left controller 3. Right controller 4 includes four operation buttons 53 to 56 (specifically, an A button 53, a B button 54, an X button 55, and a Y button 56) similarly to left controller 3. These four operation buttons 53 to 56 are substantially the same in mechanism as four operation buttons 33 to 36 in left controller 3. As shown in FIG. 5, analog stick 52 and operation buttons 53 to 56 are provided on the main surface of housing 51. Though four operation buttons are provided on the main surface of right controller 4 in the present embodiment, any number of operation buttons may be provided.

Positional relation between two types of operation portions (analog stick 52 and the operation buttons) in right controller 4 is opposite to positional relation of these two types of operation portions in left controller 3. In right controller 4, analog stick 52 is arranged under operation buttons 53 to 56, whereas in left controller 3, analog stick 32 is arranged above operation buttons 33 to 36. With such arrangement, when two controllers are used as being detached from main body apparatus 2, both of the controllers can be used with similar operational feeling.

When right controller 4 is attached to main body apparatus 2, the operation portion (specifically analog stick 52 and operation buttons 53 to 56) provided on the main surface of right controller 4 is operated, for example, with the right thumb of a user who holds game device 1. When right controller 4 is used as being detached from main body apparatus 2, the operation portion is operated, for example, with the right thumb of a user who holds right controller 4.

A first R button 60 and a ZR button 61 are provided in right controller 4. As shown in FIG. 5, first R button 60 is provided in an upper right portion on the side surface of housing 51. ZR button 61 is provided in an upper right portion as extending from the side surface to the rear surface of housing 51 (strictly speaking, the upper right portion when housing 51 is viewed from the front). ZR button 61 is provided in the rear of first R button 60 (the side of the positive direction of the z axis shown in FIG. 1). Since the upper right portion of housing 51 is rounded in the present embodiment, first R button 60 and ZR button 61 are in a rounded shape in conformity with rounding of the upper right portion of housing 51.

When right controller 4 is attached to main body apparatus 2, first R button 60 and ZR button 61 are arranged in the upper right portion of game device 1 (see FIG. 1). Therefore, a user who holds game device 1 can operate first R button 60 and ZR button 61 with his/her right forefinger or long finger.

Right controller 4 has terminal 64 for wired communication between right controller 4 and main body apparatus 2. Terminal 64 is provided at a position where it comes in contact with right terminal 21 (FIG. 3) of main body apparatus 2 when right controller 4 is attached to main body apparatus 2. Terminal 64 should be arranged at any position where main body apparatus 2 and right controller 4 are in contact with each other while right controller 4 is attached to main body apparatus 2. By way of example, as shown in FIG. 5, terminal 64 is provided around a lower end portion of the surface where slider 62 is attached.

A position, a shape, and the number of components (specifically, a slider, a stick, a button, and an LED) provided in housing 31 of left controller 3 and/or housing 51 of right controller 4 can arbitrarily be designed. For example, in another embodiment, the controller may include a direction instruction portion of a type different from the analog stick. Slider 40 or 62 may be arranged at a position in accordance with a position of left rail member 15 and right rail member 19 provided in main body apparatus 2, and for example, may be arranged in the main surface or the rear surface of housing 31 or 51. Some of the components do not have to be provided.

Right controller 4 includes a second L button 65 and a second R button 66 as in left controller 3. These buttons 65 and 66 are used for giving an instruction in accordance with various programs executed in main body apparatus 2 similarly to other operation buttons 53 to 56. As shown in FIG. 5, second L button 65 and second R button 66 are provided on a surface where slider 62 is attached. Second L button 65 is provided under the center in terms of the up-down direction (the direction of they axis shown in FIG. 1) on the surface where slider 62 is attached. Second R button 66 is provided above the center in terms of the up-down direction on the surface where slider 62 is attached. Second L button 65 and second R button 66 are arranged at positions where they cannot be pressed while right controller 4 is attached to main body apparatus 2. Second L button 65 and second R button 66 are used while right controller 4 is detached from main body apparatus 2. Second L button 65 and second R button 66 are operated, for example, with a forefinger or a long finger of left and right hands of a user who holds right controller 4 detached from main body apparatus 2.

(a5: Use of Cradle)

Figure 6:
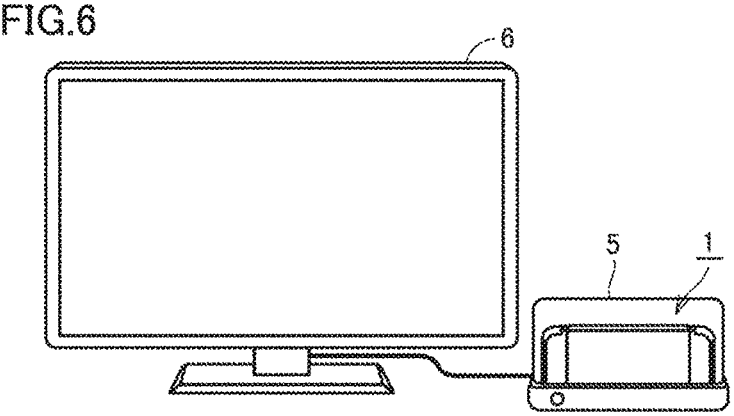
FIG. 6 is an example non-limiting schematic diagram showing appearance when game device 1 based on the present embodiment is used together with a cradle.

FIG. 6 is an example non-limiting schematic diagram showing appearance when game device 1 based on the present embodiment is used together with a cradle. The game system shown in FIG. 6 includes game device 1 and cradle 5.

Cradle 5 is constructed to be able to carry game device 1 and constructed to be able to communicate with a television 6 representing one example of an external display apparatus separate from display 12 of game device 1. When game device 1 is carried on cradle 5, an image obtained or generated by game device 1 can be shown on television 6. Communication between cradle 5 and television 6 may be wired communication or wireless communication.

Cradle 5 may have a function to charge placed game device 1 and a function as a communication hub apparatus (for example, a USB hub).

[B. Internal Configuration of Each Apparatus]

An internal configuration of each apparatus associated with the information processing system based on the present embodiment will initially be described.

(b1: Internal Configuration of Main Body Apparatus)

Figure 7:
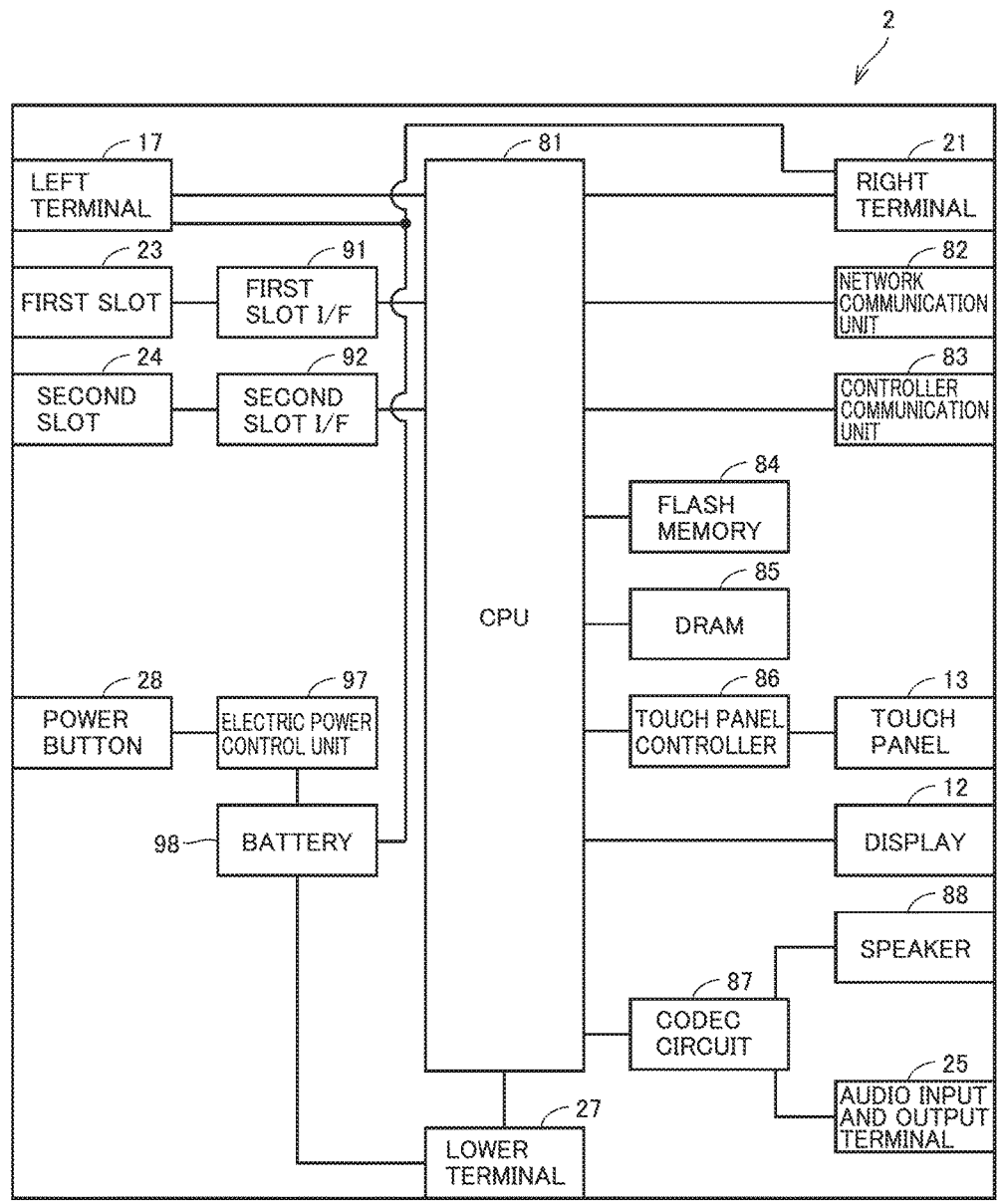
FIG. 7 is an example non-limiting block diagram showing an internal configuration of main body apparatus 2 based on the present embodiment.

FIG. 7 is an example non-limiting block diagram showing an internal configuration of main body apparatus 2 based on the present embodiment.

Main body apparatus 2 includes components shown in FIG. 7. The components shown in FIG. 7 are accommodated in housing 11, for example, as being mounted on an electronic circuit substrate as electronic components.

Main body apparatus 2 includes a central processing unit (CPU) 81 corresponding to an information processing unit (or a processor) performing various types of processing including game processing. CPU 81 reads and executes a program stored in an accessible storage unit (specifically, an internal storage medium such as a flash memory 84 or an external storage medium attached to first slot 23 or second slot 24).

Main body apparatus 2 includes flash memory 84 and a dynamic random access memory (DRAM) 85 by way of example of an embedded internal storage medium. Flash memory 84 is a non-volatile memory mainly storing various types of data (which may be a program) saved in main body apparatus 2. DRAM 85 is a volatile memory temporarily storing various types of data used in information processing.

Main body apparatus 2 includes a first slot interface (I/F) 91 and a second slot interface 92. The first slot interface is connected to first slot 23 and reads and writes data from and into a storage medium of the first type (for example, an SD card) attached to first slot 23, in response to an instruction from CPU 81. Second slot interface 92 is connected to second slot 24 and reads and writes data from and into a storage medium of the second type (for example, a dedicated memory card) attached to second slot 24, in response to an instruction from CPU 81.

Main body apparatus 2 includes a network communication unit 82 for communication (specifically, wireless communication) with an external apparatus through a network. For example, a communication module authorized for Wi-Fi is employed for network communication unit 82 and network communication unit 82 communicates with an external apparatus through wireless LAN. In another embodiment, main body apparatus 2 may have a function for connection and communication with a mobile communication network (that is, a portable telephone communication network) in addition to (or instead of) a function for connection and communication with wireless LAN.

Main body apparatus 2 includes a controller communication unit 83 for wireless communication with left controller 3 and/or right controller 4. Though any scheme is applicable for communication between main body apparatus 2 and each controller, for example, a communication scheme under the Bluetooth™ specifications can be adopted.

CPU 81 is connected to left terminal 17, right terminal 21, and lower terminal 27. CPU 81 transmits and receives data to and from left controller 3 through left terminal 17 when wired communication with left controller 3 is established. CPU 81 transmits and receives data to and from right controller 4 through right terminal 21 when wired communication with right controller 4 is established. Data transmitted from CPU 81 to left controller 3 or right controller 4 is, for example, data for controlling a vibration generation portion of left controller 3 or right controller 4. Data received by CPU 81 from left controller 3 or right controller 4 is, for example, operation data output in response to an operation by a user of the operation portion in left controller 3 or right controller 4. CPU 81 transmits data to cradle 5 through lower terminal 27 when it communicates with cradle 5.

In the present embodiment, main body apparatus 2 can establish both of wired communication and wireless communication with left controller 3 and right controller 4.

Main body apparatus 2 includes a touch panel controller 86 for control of touch panel 13. Touch panel controller 86 generates data indicating a position of a touch input in response to a signal from touch panel 13, and outputs the data to CPU 81.

Display 12 shows an image generated by execution of various types of processing by CPU 81 and/or an image obtained from the outside.

Main body apparatus 2 includes a codec circuit 87 and speaker 88 (specifically, the left speaker and the right speaker). Codec circuit 87 controls input and output of audio data to and from speaker 88 and audio input and output terminal 25. More specifically, when codec circuit 87 receives audio data from CPU 81, it outputs an audio signal resulting from D/A conversion of the audio data to speaker 88 or audio input and output terminal 25. Thus, sound is output from speaker 88 or an audio output portion (for example, an earphone) connected to audio input and output terminal 25. When codec circuit 87 receives an audio signal from audio input and output terminal 25, it subjects the audio signal to A/D conversion and outputs audio data in a prescribed format to CPU 81.

Main body apparatus 2 includes an electric power control unit 97 and a battery 98. Electric power control unit 97 controls supply of electric power from battery 98 to each component based on a command from CPU 81. Electric power control unit 97 controls supply of electric power in accordance with an input onto power button 28. When an operation to turn off power supply is performed on power button 28, electric power control unit 97 stops supply of electric power totally or in part, and when an operation to turn on power supply is performed on power button 28, it starts full supply of electric power. When an instruction to switch to a sleep mode is given to power button 28, electric power control unit 97 stops supply of electric power to some components including display 12, and when an instruction to switch to an ON mode is given to power button 28, it starts supply of electric power.

When an external charging apparatus (for example, cradle 5) is connected to lower terminal 27 and electric power is supplied to main body apparatus 2 through lower terminal 27, battery 98 is charged with supplied electric power. Battery 98 of main body apparatus 2 is preferably higher in charging capacity than a battery of left controller 3 and right controller 4.

Battery 98 is connected to left terminal 17 and right terminal 21. When left controller 3 is connected to main body apparatus 2, electric power is fed from battery 98 of main body apparatus 2 to left controller 3 through left terminal 17. When right controller 4 is attached to main body apparatus 2, electric power is fed from battery 98 of main body apparatus 2 to right controller 4 through right terminal 21.

(b2: Internal Configuration of Controller)

Figure 8:
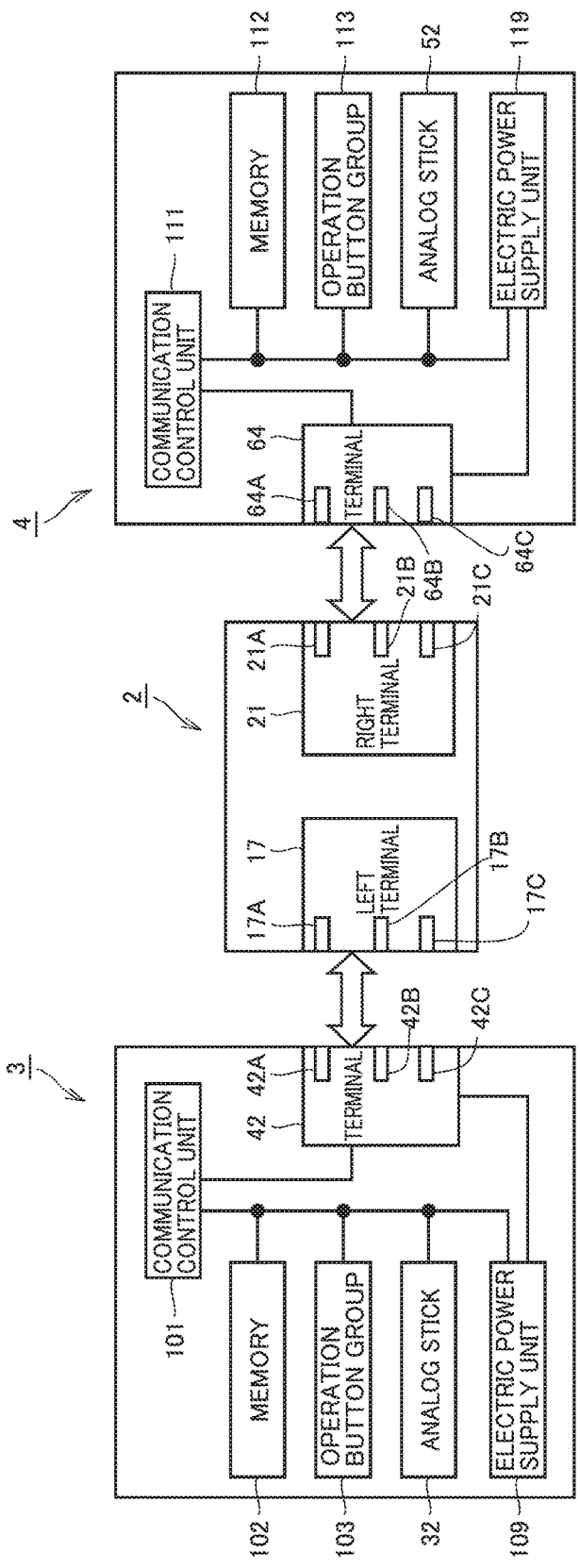
FIG. 8 is an example non-limiting block diagram showing an internal configuration of left controller 3 and right controller 4 based on the present embodiment.

FIG. 8 is an example non-limiting block diagram showing an internal configuration of left controller 3 and right controller 4 based on the present embodiment.

FIG. 8 also depicts components of main body apparatus 2 associated with left controller 3 and right controller 4.

Left controller 3 includes a communication control unit 101 for communication with main body apparatus 2. Communication control unit 101 can communicate with main body apparatus 2 through both of wired communication through terminal 42 and wireless communication not through terminal 42.

Terminal 42 includes a communication terminal 42A used for communication, a power supply terminal 42B used for power feed, and an identification terminal 42C used for detection of a connected device.

Terminal 42 is provided as being connectable to left terminal 17 of main body apparatus 2.

Left terminal 17 includes a communication terminal 17A used for communication, a power supply terminal 17B used for power feed, and an identification terminal 17C used for detection of a connected device. When terminal 42 and left terminal 17 are connected to each other, communication terminal 42A and communication terminal 17A are electrically connected to each other. Power supply terminal 42B and power supply terminal 17B are electrically connected to each other. Identification terminal 42C and identification terminal 17C are electrically connected to each other.

Communication control unit 101 selects wired communication or wireless communication depending on whether or not left controller 3 is attached to main body apparatus 2, and establishes communication under a selected communication method. While left controller 3 is attached to main body apparatus 2, communication control unit 101 establishes communication with main body apparatus 2 through communication terminal 42A. While left controller 3 is detached from main body apparatus 2, communication control unit 101 establishes wireless communication with main body apparatus 2 (specifically, controller communication unit 83). Communication control unit 101 should only be able to establish communication with main body apparatus 2, and for example, it may be configured to establish only either wired communication or wireless communication. While left controller 3 is detached from main body apparatus 2, wireless communication is established by way of example, however, wired communication may be established, for example, through a cable.

Left controller 3 includes, for example, a memory 102 such as a flash memory. Communication control unit 101 is implemented, for example, by a microprocessor and performs various types of processing by executing firmware stored in memory 102.

Left controller 3 includes an operation button group 103 (specifically operation buttons 33 to 36, 38, and 39) and analog stick 32. Information on an operation onto operation button group 103 and analog stick 32 is repeatedly output to communication control unit 101 with a prescribed period.

Communication control unit 101 obtains information on an input from each of operation button group 103 and analog stick 32 (for example, information on an operation by a user). Communication control unit 101 transmits data including obtained information (or information obtained by subjecting obtained information to prescribed processing) to main body apparatus 2. Data is transmitted to main body apparatus 2 repeatedly with a prescribed period. A period of transmission of information on an input to main body apparatus 2 may or may not be identical among input devices.

Main body apparatus 2 can know an input given to left controller 3 based on transmitted data. More specifically, main body apparatus 2 can discriminate an operation onto operation button group 103 and analog stick 32.

Left controller 3 includes an electric power supply unit 109 including a battery. Electric power supply unit 109 controls supply of electric power to each component of left controller 3. When left controller 3 is attached to main body apparatus 2, the battery is charged by power feed from main body apparatus 2 through power supply terminal 42B.

Right controller 4 is configured basically similarly to left controller 3 described above. Right controller 4 includes terminal 64, a communication control unit 111, a memory 112, an operation button group 113 (specifically operation buttons 53 to 56, 60, and 61), analog stick 52, and an electric power supply unit 119.

Since other components of right controller 4 have features and functions the same as those of corresponding components described in connection with left controller 3, detailed description will not be repeated.

Terminal 64 includes a communication terminal 64A used for communication, a power supply terminal 64B used for power feed, and an identification terminal 64C used for detection of a connected device.

Terminal 64 is provided as being connectable to right terminal 21 of main body apparatus 2.

Right terminal 21 includes a communication terminal 21A used for communication, a power supply terminal 21B used for power feed, and an identification terminal 21C used for detection of a connected device. When terminal 64 and right terminal 21 are connected to each other, communication terminal 21A and communication terminal 64A are electrically connected to each other. Power supply terminal 21B and power supply terminal 64B are electrically connected to each other. Identification terminal 21C and identification terminal 64C are electrically connected to each other.

Communication control unit 111 selects wired communication or wireless communication depending on whether or not right controller 4 is attached to main body apparatus 2, and establishes communication under a selected communication method. When right controller 4 is attached to main body apparatus 2, communication control unit 111 establishes communication with main body apparatus 2 through communication terminal 64A.

Right controller 4 includes electric power supply unit 119 including a battery. Electric power supply unit 119 controls supply of electric power to each component of right controller 4. While right controller 4 is attached to main body apparatus 2, the battery is charged by power feed from main body apparatus 2 through power supply terminal 64B.

When the controller is attached to main body apparatus 2, a first terminal (that is, left terminal 17 or right terminal 21) of main body apparatus 2 and a second terminal (that is, terminal 42 or 64) of the controller are electrically connected to each other as abutting on each other.

When the controller is attached to main body apparatus 2, whether or not connection is established is determined based on a connected identification terminal. Wired communication can be carried out through the connected communication terminal. Power can be fed through the connected power supply terminal.

The controller can also include a vibration mechanism, an acceleration sensor, and a gyro sensor.

[C. Connected Device]

(c1: Expansion Battery)

Figure 9:
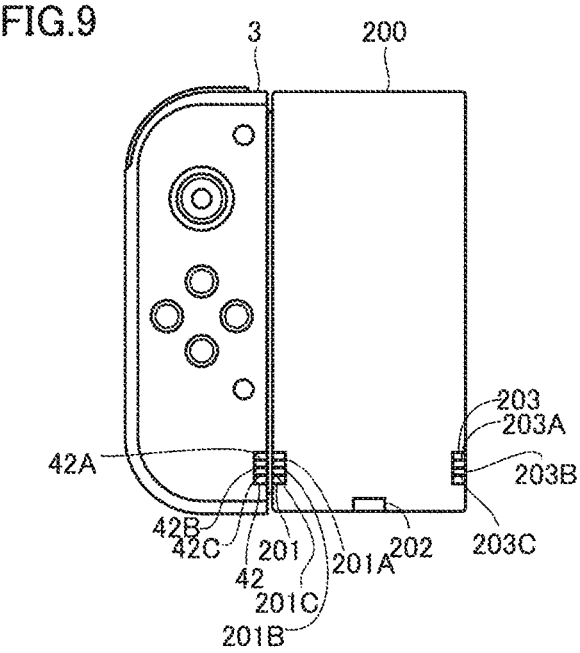
FIG. 9 is an example non-limiting diagram illustrating an expansion battery 200 which can be connected to a controller based on an embodiment.

FIG. 9 is an example non-limiting diagram illustrating an expansion battery 200 which can be connected to the controller based on an embodiment.

As shown in FIG. 9, expansion battery 200 is connected to left controller 3. Expansion battery 200 is provided to be able to supply electric power to left controller 3. Specifically, a terminal 201 which can electrically be connected to left controller 3 is provided in expansion battery 200.

Terminal 201 includes a communication terminal 201A used for communication, a power supply terminal 201B used for power feed, and an identification terminal 201C used for detection of a connected device. As terminal 42 and terminal 201 are connected to each other, communication terminal 42A and communication terminal 201A are electrically connected to each other. Power supply terminal 42B and power supply terminal 201B are electrically connected to each other. Identification terminal 42C and identification terminal 201C are electrically connected to each other.

An LED 202 indicating a state of charge to left controller 3 is provided in expansion battery 200.

Similarly to left controller 3, a terminal 203 which can electrically be connected to right controller 4 is provided in expansion battery 200. Terminal 203 includes a communication terminal 203A, a power supply terminal 203B used for power feed, and an identification terminal 203C used for detection of a connected device. As terminal 64 and terminal 203 are connected to each other, communication terminal 64A and communication terminal 203A are electrically connected to each other. Power supply terminal 64B and power supply terminal 203B are electrically connected to each other. Identification terminal 64C and identification terminal 203C are electrically connected to each other.

LED 202 emits light during charging of right controller 4 as in left controller 3.

Figure 10:
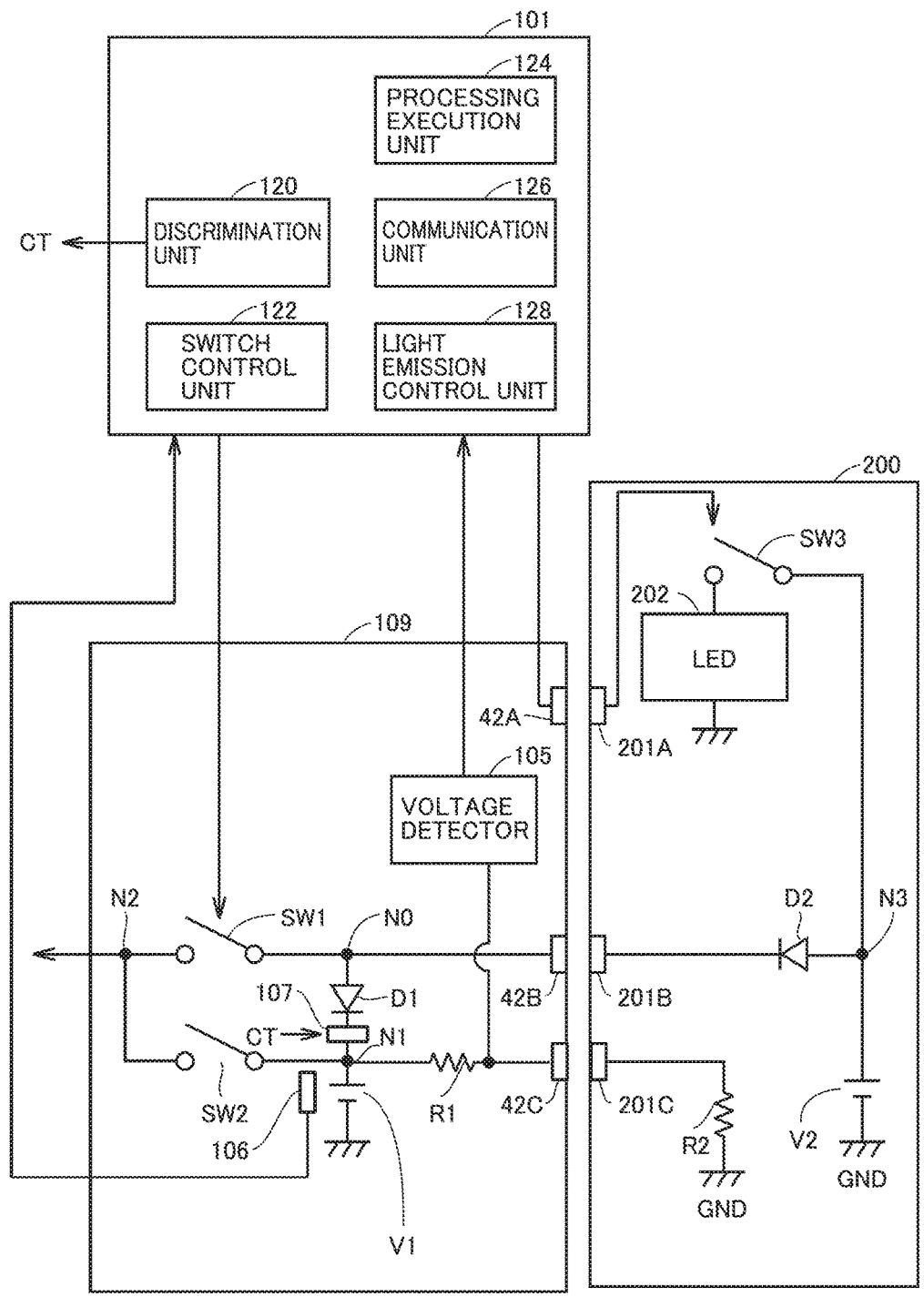
FIG. 10 is an example non-limiting diagram illustrating a circuit configuration of left controller 3 and expansion battery 200 based on the embodiment.

FIG. 10 is an example non-limiting diagram illustrating a circuit configuration of left controller 3 and expansion battery 200 based on the embodiment.

As shown in FIG. 10, electric power supply unit 109 is provided in left controller 3.

Electric power supply unit 109 includes a voltage detector 105, a state-of-charge sensing unit 106, a current regulator 107, a resistor R1, a battery V1, a diode D1, and switches SW1 and SW2.

A node N1 is connected to identification terminal 42C with resistor R1 being interposed.

A node N0 is connected to power supply terminal 42B.

Diode D1 has an anode connected to node NO and a cathode connected to node N1 with current regulator 107 being interposed. Current regulator 107 is provided between diode D1 and node N1.

Battery V1 is connected between node N1 and a ground voltage GND. Switch SW1 is connected between a node N2 and node NO. Switch SW2 is connected between node N2 and node N1. Voltage detector 105 is connected to node N0. Switches SW1 and SW2 are controlled in accordance with an instruction from communication control unit 101.

Node N2 is connected to a power supply line so that electric power necessary for each unit is supplied.

State-of-charge sensing unit 106 is provided in correspondence with battery V1, and senses a state of charge of battery V1 and outputs the state of charge to communication control unit 101.

Expansion battery 200 includes a battery V2, a diode D2, a resistor R2, LED 202, and a switch SW3.

Resistor R2 is connected between identification terminal 201C and ground voltage GND.

Diode D2 is connected in series between power supply terminal 201B and a node N3. Diode D2 has an anode connected to node N3 and a cathode connected to power supply terminal 201B. Battery V2 is connected between node N3 and ground voltage GND. Switch SW3 and LED 202 are connected in series between node N3 and ground voltage GND. Switch SW3 is controlled in accordance with an instruction from communication control unit 101.

Communication control unit 101 includes a discrimination unit 120, a switch control unit 122, a processing execution unit 124, a communication unit 126, and a light emission control unit 128.

Discrimination unit 120 discriminates a device connected to terminal 42 based on a voltage value detected by voltage detector 105. Discrimination unit 120 outputs a control signal CT for regulating a current to current regulator 107.

Switch control unit 122 controls switching of switches SW1 and SW2 in accordance with a result of discrimination by discrimination unit 120. For example, when no device is connected to terminal 42, switch control unit 122 turns on switch SW2. Thus, battery V1 is connected to the power supply line and electric power necessary for each unit is supplied. When discrimination as connection of a connected device is made in accordance with a result of discrimination by discrimination unit 120 while electric power necessary for each unit is supplied from battery V1, switch control unit 122 turns off switch SW2 and turns on switch SW1. Battery V1 and the power supply line are thus electrically connected and disconnected to and from each other. As switch SW1 is turned on, terminal 42 and the power supply line are electrically connected to each other and power can be fed through terminal 42.

Communication unit 126 performs processing for wireless communication and processing for wired communication with an external device.

Specifically, in the present embodiment, communication unit 126 transmits attachment information on another attached apparatus to main body apparatus 2. In the present example, communication unit 126 transmits attachment information (an identification code) based on a result of discrimination by discrimination unit 120 to main body apparatus 2. When another apparatus is not attached, communication unit 126 can also transmit attachment information (an identification code) indicating absence of attachment.

Processing execution unit 124 performs prescribed processing in accordance with an instruction from an external device received at communication unit 126.

Light emission control unit 128 controls the LED provided in the device based on a result of discrimination by discrimination unit 120 and a result of sensing by state-of-charge sensing unit 106. In the present example, a command to turn on switch SW3 is output.

As a result of connection between terminal 42 and terminal 201, identification terminal 42C of left controller 3 and identification terminal 201C of expansion battery 200 are electrically connected to each other. Power supply terminal 42B of left controller 3 and power supply terminal 201B of expansion battery 200 are electrically connected to each other. Communication terminal 42A of left controller 3 and communication terminal 201A of expansion battery 200 are electrically connected to each other.

In the present example, as a result of electrical connection between identification terminal 42C and identification terminal 201C, a current flows from battery V1 through resistors R1 and R2 toward ground voltage GND. As a current path is formed, connection with a connected device is detected.

Voltage detector 105 detects a voltage based on division of resistances of resistor R1 and resistor R2 as a result of formation of the current path.

Discrimination unit 120 detects a connected device based on a detected voltage value and discriminates the connected device. In the present example, a resistance value of resistor R2 is different depending on a type of a connected device connected to the controller. Therefore, a voltage value detected by voltage detector 105 is different depending on a type of a device.

Discrimination unit 120 instructs switch control unit 122 to switch based on a result of discrimination.

Switch control unit 122 gives an instruction to turn off switch SW2 and turn on switch SW1. Accordingly, instead of battery V1, battery V2 supplies electric power to each unit in left controller 3.

Battery V1 is chargeable and dischargeable. As switch SW is switched by switch control unit 122, battery V1 is charged as a result of supply of electric power from battery V2 when electric power is supplied from battery V2 to each unit in left controller 3.

Current regulator 107 regulates a charging current in charging of battery V1 from battery V2. Specifically, a charging current for battery V1 is regulated in accordance with control signal CT from discrimination unit 120.

Light emission control unit 128 outputs a command signal for having the LED emit light based on a result of discrimination by discrimination unit 120 and a result of sensing by state-of-charge sensing unit 106. The command signal is input to switch SW3 through communication terminal 42A and communication terminal 201A from communication control unit 101.

Specifically, light emission control unit 128 outputs a command signal to turn on switch SW3 when a connected device is discriminated as a device having an LED as a result of discrimination by discrimination unit 120 and battery V1 is in a prescribed state of charge. The prescribed state of charge refers to battery V1 not being fully charged by way of example. When battery V1 is fully charged, battery V1 is not charged by battery V2. In such a case, light emission control unit 128 does not output a command signal to turn on switch SW3 and hence LED 202 does not emit light. Therefore, fully charged battery V1 can easily be recognized. When light emission control unit 128 outputs a command signal to turn on switch SW3 and LED 202 emits light, battery V1 being charged can easily be recognized. For example, expansion battery 200 may be removed and attached from and to left controller 3 based on a state of emission of light by LED 202. In the present example, light emission control unit 128 outputs a command signal for having the LED emit light based on a result of discrimination by discrimination unit 120 and a result of sensing by state-of-charge sensing unit 106. A command signal for having the LED emit light only in accordance with a result of discrimination by discrimination unit 120, however, may be output. Thus, a connection state can easily be checked.

A connected device described below is also similar in circuit configuration or in configuration of the battery and the LED to expansion battery 200. A resistance value of resistor R2 is different depending on a type of a connected device.

(c2: Expansion Grip 300)

Figure 11:
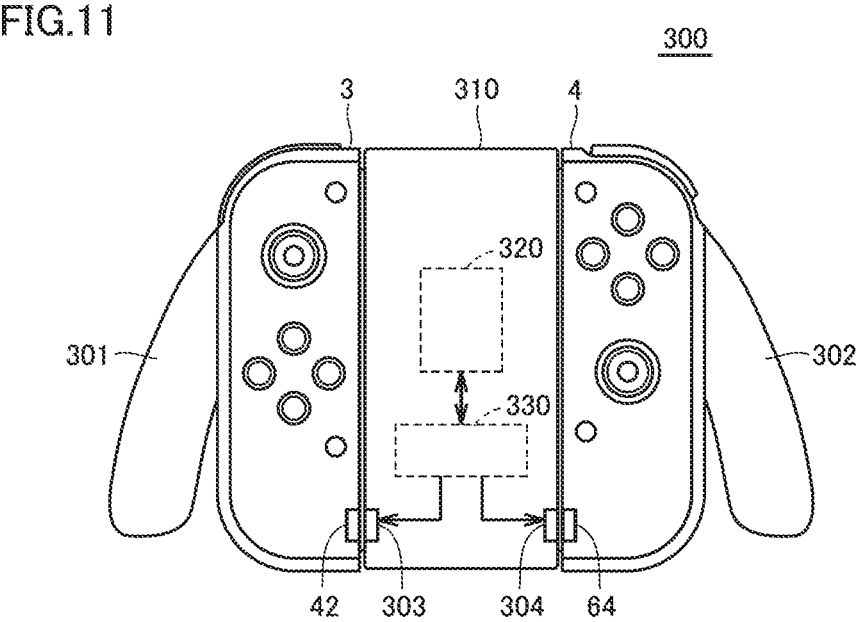
FIG. 11 is an example non-limiting diagram showing appearance of an expansion grip 300 based on the embodiment.

FIG. 11 is an example non-limiting diagram of appearance of an expansion grip 300 based on the embodiment.

Expansion grip 300 for attaching left controller 3 and right controller 4 detached from main body apparatus 2 is shown in FIG. 11. Expansion grip 300 represents one example of a connected device to which a controller can be attached. Expansion grip 300 is a connected device with which a user performs an operation.

Expansion grip 300 includes a housing 310. Left controller 3 and right controller 4 can be attached to housing 310. Therefore, with expansion grip 300, a user can perform an operation as integrally holding two controllers of left controller 3 and right controller 4 detached from main body apparatus 2. Expansion grip 300 has a mechanism similar to the mechanism of main body apparatus 2 as the mechanism for attachment of the controller. Therefore, left controller 3 and right controller 4 can be attached to expansion grip 300 as in attachment of main body apparatus 2.

Expansion grip 300 has a grip portion for a user to hold. Specifically, left controller 3 is attached to expansion grip 300 on the left of the center in the lateral direction. Expansion grip 300 includes a left grip portion 301 on the left of a portion where left controller 3 is attached. Right controller 4 is attached to expansion grip 300 on the right of the center in terms of the lateral direction. Expansion grip 300 includes a right grip portion 302 on the right of a portion where right controller 4 is attached. Therefore, a user can easily operate each of left controller 3 and right controller 4 attached to expansion grip 300 by holding grip portions 301 and 302.

Expansion grip 300 has a left terminal 303 similar to left terminal 17 of main body apparatus 2 at a position where connection with terminal 42 of left controller 3 attached to the expansion grip itself can be made. Expansion grip 300 has a right terminal 304 similar to right terminal 21 of main body apparatus 2 at a position where connection with terminal 64 of right controller 4 attached to the expansion grip itself can be made. Therefore, when left controller 3 and right controller 4 are attached to expansion grip 300, expansion grip 300 is electrically connected to left controller 3 and right controller 4.

Left terminal 303 and right terminal 304 each include a communication terminal, a power supply terminal, and an identification terminal which can be connected to the communication terminal, the power supply terminal, and the identification terminal of terminals 42 and 64, respectively, similarly to terminals 201 and 203 of expansion battery 200.

Therefore, when the controller and expansion grip 300 are connected to each other, communication and supply of electric power therebetween can be enabled. Though not shown, expansion grip 300 includes a power supply terminal similar to a power supply terminal of cradle 5. Therefore, expansion grip 300 can receive power feed through the power supply terminal from a not-shown charging apparatus (such as an AC adapter) when the charging apparatus is connected to the power supply terminal. Expansion grip 300 supplies electric power supplied through the power supply terminal to left controller 3 and right controller 4 through the left terminal and the right terminal.

Therefore, by connecting expansion grip 300 to the charging apparatus, left controller 3 and right controller 4 attached to expansion grip 300 can be charged. As set forth above, expansion grip 300 has a function to charge the controller attached to the expansion grip itself. Expansion grip 300 includes charging means (that is, the power supply terminal and the left terminal or the right terminal) for charging the controller attached to expansion grip 300 with electric power fed to expansion grip 300. Thus, the controller can be charged while the controller is attached to the expansion grip. Thus, convenience of the controller can be improved. When left controller 3 and right controller 4 are attached to expansion grip 300, wireless communication is established between each of left controller 3 and right controller 4 and main body apparatus 2 (as in the example in which left controller 3 and right controller 4 are detached from main body apparatus 2). Even while the controller is attached to expansion grip 300, left controller 3 and right controller 4 can communicate with main body apparatus 2.

Expansion grip 300 contains a microcomputer (CPU) 320 and a communication unit 330. Left controller 3 and right controller 4 obtain apparatus identification information indicating attachment to expansion grip 300, which is transmitted from microcomputer 320 through communication unit 330, when the controller is attached to expansion grip 300. The apparatus identification information is, for example, identification information provided for each apparatus (more specifically, identification information specific to an apparatus). In the present embodiment, the apparatus identification information includes information indicating a type of an apparatus so that a type of the apparatus can be specified based on the apparatus identification information.

The controller can determine (or sense) that an apparatus to which the controller is attached is expansion grip 300, that is, attachment of the controller itself to expansion grip 300, based on the identification information. When the controller is detached from expansion grip 300, the controller transmits a notification about detachment from expansion grip 300 through wireless communication to main body apparatus 2.

(c3: Trial Play Stand Expansion Battery)

Figure 12:
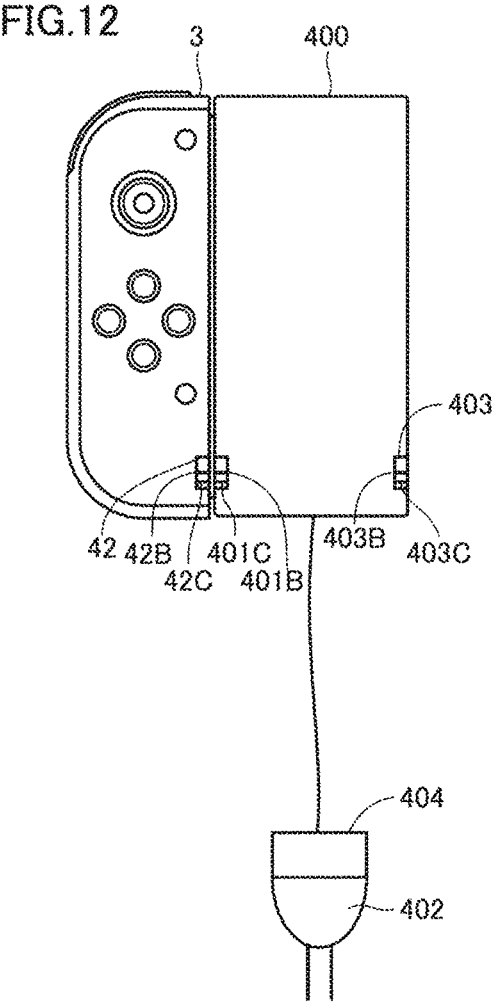
FIG. 12 is an example non-limiting diagram illustrating a trial play stand expansion battery 400 which can be connected to the controller based on the embodiment.

FIG. 12 is an example non-limiting diagram illustrating a trial play stand expansion battery 400 which can be connected to the controller based on the embodiment.

As shown in FIG. 12, trial play stand expansion battery 400 is connected to left controller 3. Trial play stand expansion battery 400 is provided to be able to supply electric power to left controller 3.

Specifically, trial play stand expansion battery 400 is provided with a terminal 401 which can electrically be connected to left controller 3.

Terminal 401 includes a power supply terminal 401B used for power feed and an identification terminal 401C used for detection of a connected device. As a result of connection between terminal 42 and terminal 401, power supply terminal 42B and power supply terminal 401B are electrically connected to each other. Identification terminal 42C and identification terminal 401C are electrically connected to each other.

Trial play stand expansion battery 400 is provided with a terminal 403 which can electrically be connected to right controller 4. Terminal 403 includes a power supply terminal 403B used for power feed and an identification terminal 403C used for detection of a connected device. As a result of connection between terminal 64 and terminal 403, power supply terminal 64B and power supply terminal 403B are electrically connected to each other. Identification terminal 64C and identification terminal 403C are electrically connected to each other.

Trial play stand expansion battery 400 is connected to an AC plug terminal 402 and an AC adapter 404. AC plug terminal 402 can be connected to a connector of an AC power supply. AC adapter 404 converts AC power supply to DC power supply so as to supply electric power to trial play stand expansion battery 400. According to such a configuration, trial play stand expansion battery 400 can constantly receive power feed from the AC power supply. Trial play stand expansion battery 400 supplies electric power to left controller 3 and right controller 4 through terminal 401 and/or terminal 403.

(c4: Fixed Expansion Battery)

Figure 13:
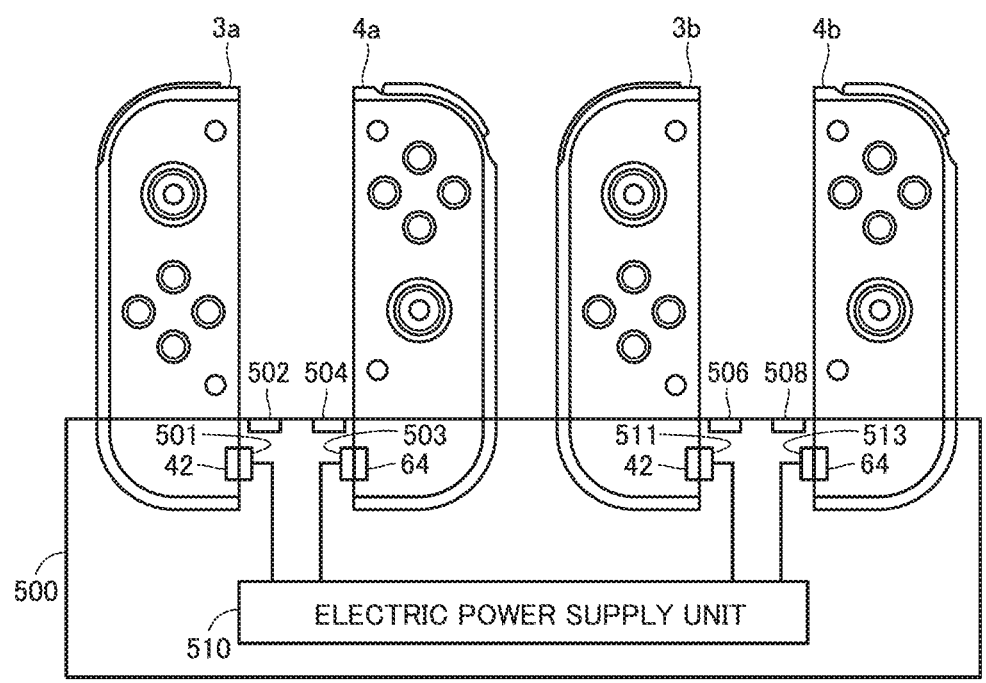
FIG. 13 is an example non-limiting diagram illustrating a fixed expansion battery 500 which can be connected to a plurality of controllers based on the embodiment.

FIG. 13 is an example non-limiting diagram illustrating a fixed expansion battery 500 which can be connected to a plurality of controllers based on the embodiment.

As shown in FIG. 13, fixed expansion battery 500 is provided to be able to supply electric power to a plurality of controllers. In the present example, two left controllers 3 and two right controller 4 can be connected. Fixed expansion battery 500 is provided to be able to supply electric power to a plurality of left controllers 3 and a plurality of right controllers 4.

Terminals 501 and 511 which can be connected to left controller 3 and terminals 503 and 513 which can be connected to right controller 4 are provided. Terminals 501, 511, 503, and 513 are connected to an electric power supply unit 510 provided with a battery.

Each terminal includes a communication terminal, a power supply terminal, and an identification terminal which can be connected to the communication terminal, the power supply terminal, and the identification terminal, respectively, of terminal 42 or 64, similarly to terminal 201 or 203 of expansion battery 200.

Therefore, when the controller and fixed expansion battery 500 are connected to each other, communication and supply of electric power therebetween can be enabled. Though not shown, fixed expansion battery 500 includes a power supply terminal similar to the power supply terminal of cradle 5. Therefore, fixed expansion battery 500 can receive power feed through the power supply terminal from a not-shown charging apparatus (such as an AC adapter) by connecting the charging apparatus to the power supply terminal. Fixed expansion battery 500 supplies electric power supplied through the power supply terminal to left controller 3 and right controller 4 through the terminal.

A plurality of LEDs indicating a state of charge are provided in fixed expansion battery 500. Specifically, the fixed expansion battery includes an LED 502 indicating a state of charge of the controller connected to terminal 501, an LED 504 indicating a state of charge of the controller connected to terminal 503, an LED 506 indicating a state of charge of the controller connected to terminal 511, and an LED 508 indicating a state of charge of the controller connected to terminal 513.

Emission of light from the LED is controlled under a scheme the same as above through the communication terminal used for communication.

[D. Processing]

FIG. 14 is an example non-limiting diagram illustrating a discrimination table used by discrimination unit 120 based on the embodiment.

As shown in FIG. 14, a discrimination table may be stored in advance in memories 102 and 112. The discrimination table is provided with a plurality of pieces of identification information ID0 to ID4 (identification codes). A voltage value, an amount of a charging current, a notification about charging, and an exemplary device are set in association with identification information. The exemplary device is given as an item for illustration and such information does not have to be stored.

By way of example, a voltage value (P0 to P1), an amount of a charging current Q1, a notification about charging (no), and an exemplary device (a main body and an expansion grip) are set in association with identification information ID0.

A voltage value (P1 to P2), amount of a charging current Q1, a notification about charging (no), and an exemplary device (a trial play stand expansion battery) are set in association with identification information ID1.

A voltage value (P2 to P3), an amount of a charging current Q2 (<Q1), a notification about charging (yes), and an exemplary device (a fixed expansion battery) are set in association with identification information ID2.

A voltage value (P3 to P4), an amount of a charging current Q1, a notification about charging (yes), and an exemplary device (an expansion battery) are set in association with identification information ID3.

Identification information ID4 is an item indicating connection of no device, and nothing is set as a voltage value, an amount of a charging current, a notification about charging, and an exemplary device.

In the present embodiment, a connected device connected to a controller is identified based on a result of detection by voltage detector 105 described above. A resistance value of resistor R2 described with reference to FIG. 10 is different for each device. Specifically, resistor R2 of each of main body apparatus 2 and expansion grip 300 is set to have a resistance value at which a voltage value within a range from P0 to P1 is detected in attachment to the controller.

Resistor R2 of trial play stand expansion battery 400 is set to have a resistance value at which a voltage value within a range from P1 to P2 is detected in attachment to the controller.

Resistor R2 of fixed expansion battery 500 is set to have a resistance value at which a voltage value within a range from P2 to P3 is detected in attachment to the controller.

Resistor R2 of expansion battery 200 is set to have a resistance value at which a voltage value within a range from P3 to P4 is detected in attachment to the controller.

(d1: Processing by Controller When Expansion Battery 200 is Attached)

Voltage detector 105 detects a voltage value within the range from P3 to P4 when expansion battery 200 is connected to the controller.

Discrimination unit 120 identifies a connected device as the expansion battery corresponding to identification information ID3 by using the discrimination table based on the voltage value.

Discrimination unit 120 instructs switch control unit 122 to switch conducting switch SW2 to switch SW1 based on a result of discrimination. Accordingly, the controller operates by receiving power feed from expansion battery 200.

Discrimination unit 120 outputs control signal CT to current regulator 107 such that amount of a charging current Q1 is attained based on a result of discrimination. Thus, current regulator 107 regulates the amount of the charging current in charging of the battery of the controller from expansion battery 200.

Light emission control unit 128 controls LED 202 provided in expansion battery 200 based on a result of discrimination by discrimination unit 120 and a result of sensing by state-of-charge sensing unit 106. Specifically, since the item of the notification about charging corresponding to identification information ID3 indicates "yes", light emission control unit 128 recognizes that an LED for giving a notification about charging is provided. Then, when light emission control unit 128 determines that battery V1 is fully charged based on a result of sensing by state-of-charge sensing unit 106, it does not output a command signal to turn on switch SW3. When light emission control unit 128 determines that battery V1 is not fully charged based on a result of sensing by state-of-charge sensing unit 106, it outputs a command signal to turn on switch SW3. Accordingly, LED 202 emits light.

Communication unit 126 transmits identification information ID3 to main body apparatus 2 as a result of discrimination by discrimination unit 120. Controller communication unit 83 of main body apparatus 2 obtains identification information ID3 transmitted from communication unit 126. Then, the information is given from controller communication unit 83 of main body apparatus 2 to CPU 81. CPU 81 can recognize connection of expansion battery 200 to the controller in accordance with obtained identification information ID3. On the side of main body apparatus 2, CPU 81 performs information processing upon receiving the information.

CPU 81 can perform prescribed representation processing by way of example of information processing. Specifically, information on expansion battery 200 may be shown on display 12 in accordance with identification information ID3. CPU 81 may adjust a parameter for operation data transmitted from the controller by way of another example of information processing, because operational feeling of the controller may be different between before and after connection of expansion battery 200.

Main body apparatus 2 may instruct the controller to perform prescribed processing depending on a recognized connected device. For example, by way of example, CPU 81 may give an instruction to change some of functions of the controller in accordance with obtained identification information ID3. For example, CPU 81 may output an order to stop a vibration mechanism when the controller is provided with the vibration mechanism.

Communication unit 126 of the controller receives the order and outputs the order to processing execution unit 124. Processing execution unit 124 may change to setting for not using the vibration mechanism based on the order transmitted from main body apparatus 2.

Since the function of the controller can be changed under the control by main body apparatus 2 depending on a type of a connected device, usability can be improved.

(d2: Processing by Controller When Expansion Grip 300 is Attached)

When expansion grip 300 is connected to the controller, voltage detector 105 detects a voltage value within the range from P0 to P1.

When the controller is connected to expansion grip 300, the controller obtains apparatus identification information from microcomputer 320 of expansion grip 300 through communication unit 330.

Discrimination unit 120 identifies a connected device as an expansion grip corresponding to identification information ID0 based on the detected voltage value and the apparatus identification information (identification information specific to the expansion grip) by using the discrimination table.

In the present example, discrimination unit 120 identifies a connected device as the expansion grip corresponding to identification information ID0 based on the detected voltage value and the apparatus identification information, however, determination may be made based on any one of them.

Discrimination unit 120 instructs switch control unit 122 to switch conducting switch SW2 to switch SW1 based on a result of discrimination. Accordingly, the controller operates by receiving power feed from expansion grip 300.

Discrimination unit 120 outputs control signal CT to current regulator 107 such that amount of a charging current Q1 is attained based on a result of discrimination. Thus, current regulator 107 regulates the amount of the charging current in charging of the battery of the controller from expansion grip 300.

Since expansion grip 300 is provided with no LED, light emission control unit 128 does not output a command signal.

Communication unit 126 transmits identification information ID0 and apparatus identification information to main body apparatus 2 as a result of discrimination by discrimination unit 120. Controller communication unit 83 of main body apparatus 2 obtains identification information ID0 and the apparatus identification information transmitted from communication unit 126. Then, the information is given from controller communication unit 83 of main body apparatus 2 to CPU 81. CPU 81 can recognize connection of expansion grip 300 to the controller in accordance with obtained identification information ID0 and the apparatus identification information. On the side of main body apparatus 2, CPU 81 can perform information processing as described above upon receiving the information.

When expansion grip 300 is connected to the controller, main body apparatus 2 can easily discriminate that the device contains the microcomputer because apparatus identification information from microcomputer 320 is obtained.

(d3: Processing by Controller When Trial Play Stand Expansion Battery 400 is Attached)

Voltage detector 105 detects a voltage value within the range from P1 to P2 when trial play stand expansion battery 400 is connected to the controller.

Discrimination unit 120 identifies a connected device as an expansion battery corresponding to identification information ID1 by using the discrimination table based on the voltage value.

Discrimination unit 120 instructs switch control unit 122 to switch conducting switch SW2 to switch SW1 based on a result of discrimination. Accordingly, the controller operates by receiving power feed from trial play stand expansion battery 400.

Discrimination unit 120 outputs control signal CT to current regulator 107 such that amount of a charging current Q1 is attained based on a result of discrimination. Thus, current regulator 107 regulates the amount of the charging current in charging of the battery of the controller from trial play stand expansion battery 400.

Since trial play stand expansion battery 400 is provided with no LED, light emission control unit 128 does not output a command signal.

Communication unit 126 transmits identification information ID1 to main body apparatus 2 as a result of discrimination by discrimination unit 120. Controller communication unit 83 of main body apparatus 2 obtains identification information ID1 transmitted from communication unit 126. Then, the information is given from controller communication unit 83 of main body apparatus 2 to CPU 81. CPU 81 can recognize connection of trial play stand expansion battery 400 to the controller in accordance with obtained identification information ID1. On the side of main body apparatus 2, CPU 81 can perform information processing as described above upon receiving the information.

(d4: Processing by Controller When Fixed Expansion Battery 500 is Attached)

Voltage detector 105 detects a voltage value within the range from P2 to P3 when fixed expansion battery 500 is connected to the controller.

Discrimination unit 120 identifies a connected device as the fixed expansion battery corresponding to identification information ID2 by using the discrimination table based on the voltage value.

Discrimination unit 120 instructs switch control unit 122 to switch conducting switch SW2 to switch SW1 based on a result of discrimination. Accordingly, the controller operates by receiving power feed from fixed expansion battery 500.

Discrimination unit 120 outputs control signal CT to current regulator 107 such that amount of a charging current Q2 is attained based on a result of discrimination. Thus, current regulator 107 regulates the amount of the charging current in charging of the battery of the controller from fixed expansion battery 500.

In the present example, amount of charging current Q2 is set to a value smaller than amount of charging current Q1. Since fixed expansion battery 500 is provided to be able to charge a plurality of controllers, the amount of the charging current is set to a value smaller than amount of charging current Q1 in order to appropriately distribute a current.

Light emission control unit 128 controls a corresponding LED provided in fixed expansion battery 500 based on a result of discrimination by discrimination unit 120 and a result of sensing by state-of-charge sensing unit 106. Specifically, since the item for the notification about charging corresponding to identification information ID2 indicates "yes", light emission control unit 128 recognizes that an LED for giving a notification about charging is provided. Then, when light emission control unit 128 determines that battery V1 is fully charged based on a result of sensing by state-of-charge sensing unit 106, it does not output a command signal for turning on switch SW3. When light emission control unit 128 determines that battery V1 is not fully charged based on a result of sensing by state-of-charge sensing unit 106, it outputs a command signal for turning on switch SW3. Accordingly, a corresponding LED emits light.

Communication unit 126 transmits identification information ID2 to main body apparatus 2 as a result of discrimination by discrimination unit 120. Controller communication unit 83 of main body apparatus 2 obtains identification information ID2 transmitted from communication unit 126. Then, the information is given from controller communication unit 83 of main body apparatus 2 to CPU 81. CPU 81 can recognize connection of fixed expansion battery 500 to the controller in accordance with obtained identification information ID2. On the side of main body apparatus 2, CPU 81 can perform information processing as described above upon receiving the information.

Through the processing, discrimination unit 120 can identify a connected device connected to the controller with a simplified scheme based on a result of detection by voltage detector 105.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A game system comprising:
   a game controller;
   a connected device connected to the game controller; and
   a main body apparatus,
   the connected device including
      a first battery for supplying electric power to the game controller,
      a first terminal electrically connected to the game controller, and
      a resistor connected to the first terminal,
   the game controller including
      a controlled component,
      a second battery for supplying electric power to the controlled component,
      a second terminal electrically connected to the connected device,
      a voltage detecting circuit detecting a voltage value in accordance with a current which flows through the resistor when the first terminal and the second terminal are connected to each other, and
      a control circuit, wherein
      the control circuit discriminates a device connected to the game controller based on a voltage value detected by the voltage detecting circuit,
      switches from the second battery to the first battery for supply of electric power to the controlled component when the discriminated device is the connected device while electric power is supplied from the second battery to the controlled component, and
      transmits a result of discrimination to the main body apparatus, and
      wherein the control circuit transmits the result of discrimination to the main body apparatus through wireless communication.

2. The operation system according to claim 1, wherein the connected device includes a light emitter emitting light in accordance with a result of discrimination by the control circuit.

3. The operation system according to claim 2, wherein
the game controller includes a light emission control circuit controlling the light emitter to emit light when the device discriminated by the control circuit is the connected device.

4. The operation system according to claim 3, wherein
the second battery is configured to be charged through supply of electric power from the first battery as switching from the second battery to the first battery is made by the control circuit.

5. The operation system according to claim 4, wherein
the light emission control circuit determines whether a state of charge of the second battery is equal to or higher than a prescribed level, and has the light emitter emit light when the light emission control circuit determines that the state of charge of the second battery is not equal to or higher than the prescribed level.

6. The operation system according to claim 1, the operation system comprising another connected device different from the connected device, wherein
the another connected device further includes a microcomputer, a third terminal electrically connected to the game controller, and a device communication circuit transmitting identification information of the another connected device itself to the game controller from the microcomputer through the third terminal, and
the control circuit of the game controller discriminates a device connected to the game controller based on any of the transmitted identification information and the voltage value detected by the voltage detecting circuit.

7. The game system according to claim 1, wherein
the main body apparatus includes an information processing circuit performing information processing based on the result of discrimination by the control circuit.

8. The game system according to claim 7, wherein
the information processing circuit displays, on a display, information on the device connected to the game controller and discriminated based on the result of discrimination by the control circuit.

9. A game controller configured to be connected to a connected device including a first battery configured to supply electric power and a first terminal for supplying electric power from the first battery, the game controller comprising:
a controlled component;
a second battery for supplying electric power to the controlled component;
a second terminal for electrical connection to the connected device;
a voltage detecting circuit detecting a voltage value in accordance with a current which flows through a resistor provided in the connected device when the first terminal and the second terminal are connected to each other; and
a control circuit, wherein
the control circuit discriminates a device connected to the game controller based on a voltage value detected by the voltage detecting circuit; and
switches from the second battery to the first battery for supply of electric power to the controlled component when the discriminated device is the connected device while electric power is supplied from the second battery to the controlled component, and
wherein
the control circuit transmits a result of discrimination to a main body apparatus through wireless communication.

10. The game controller according to claim 9, the game controller further comprising a light emission control circuit controlling a light emitter provided in the connected device to emit light when the device discriminated by the control circuit is the connected device.

11. The game controller according to claim 10, wherein
the second battery is configured to be charged through supply of electric power from the first battery as switching from the second battery to the first battery is made by the control circuit.

12. The game controller according to claim 11, wherein
the light emission control circuit determines whether a state of charge of the second battery is equal to or higher than a prescribed level, and controls the light emitter to emit light when the device discriminated by the control circuit is the connected device and the light emission control circuit determines that the state of charge of the second battery is not equal to or higher than the prescribed level.

13. The game controller according to claim 9, wherein
the control circuit receives an instruction from the main body apparatus based on the result of discrimination, and
performs prescribed processing in accordance with the instruction received from the main body apparatus.

14. The game controller according to claim 9, the game controller further comprising a memory storing a table in which identification information for identifying a connected device and a voltage value are brought in correspondence with each other, wherein
the control circuit discriminates a device connected to the game controller with reference to the table stored in the memory, based on the voltage value detected by the voltage detecting circuit.

15. The game controller according to claim 9, wherein the game controller is configured to be connected to another connected device different from the connected device, wherein
the another connected device includes a microcomputer, a third terminal electrically connected to the game controller, and a device communication circuit transmitting identification information of the another connected device itself to the game controller from the microcomputer through the third terminal, and
the control circuit discriminates a device connected to the game controller based on any of the transmitted identification information and the voltage value detected by the voltage detecting circuit.

* * * * *